(12) United States Patent
Jung et al.

(10) Patent No.: US 12,242,041 B2
(45) Date of Patent: Mar. 4, 2025

(54) OPTICAL IMAGING SYSTEM AND MOBILE ELECTRONIC DEVICE

(71) Applicant: Samsung Electro-Mechanics Co., Ltd., Suwon-si (KR)

(72) Inventors: Phil Ho Jung, Suwon-si (KR); Yong Joo Jo, Suwon-si (KR); Jae Hyun Baik, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 29 days.

(21) Appl. No.: 18/465,407

(22) Filed: Sep. 12, 2023

(65) Prior Publication Data

US 2023/0418031 A1    Dec. 28, 2023

Related U.S. Application Data

(63) Continuation of application No. 17/710,048, filed on Mar. 31, 2022, now Pat. No. 11,789,241, which is a
(Continued)

(30) Foreign Application Priority Data

Jul. 20, 2018    (KR) .................. 10-2018-0084858
Oct. 12, 2018    (KR) .................. 10-2018-0121780

(51) Int. Cl.
*G02B 13/00*    (2006.01)
*G02B 9/62*    (2006.01)
(Continued)

(52) U.S. Cl.
CPC ........... *G02B 13/0045* (2013.01); *G02B 9/62* (2013.01); *G02B 9/64* (2013.01); *H04N 5/265* (2013.01); *H04N 23/90* (2023.01)

(58) Field of Classification Search
CPC ........ G02B 13/0045; G02B 9/62; G02B 9/64; G02B 13/0015; H04N 5/265; H04N 23/90; H04N 23/45
See application file for complete search history.

(56) References Cited

U.S. PATENT DOCUMENTS 9,645,359 B2    5/2017    Liu et al.
9,964,739 B1    5/2018    Shi
(Continued)

FOREIGN PATENT DOCUMENTS

CN    106168702 A    11/2016
CN    106501920 A    3/2017
(Continued)

OTHER PUBLICATIONS

Chinese Office Action Issued on Jan. 17, 2024, in Counterpart Chinese Patent Application No. 202210920653.6 (8 Pages in English, 8 Pages in Chinese).
(Continued)

*Primary Examiner* — Collin X Beatty
(74) *Attorney, Agent, or Firm* — NSIP Law

(57) ABSTRACT

An optical imaging system includes a first lens, a second lens, a third lens, a fourth lens, a fifth lens, and a sixth lens, sequentially disposed from an object side. The first lens has negative refractive power, an image side surface thereof is concave, and an angle of view of the optical system including the first lens to the sixth lens is 100° or more. When a focal length of the first lens is f1_1, and a total focal length of the optical system including the first lens to the sixth lens is F1, $1.0<|f1\_1/F1|<2.0$ is satisfied.

20 Claims, 29 Drawing Sheets

Related U.S. Application Data continuation of application No. 16/421,986, filed on May 24, 2019, now Pat. No. 11,320,632.

(51) Int. Cl.
*G02B 9/64* (2006.01)
*H04N 5/265* (2006.01)
*H04N 23/90* (2023.01)

(56) References Cited

U.S. PATENT DOCUMENTS

| | | |
|---|---|---|
| 10,156,703 B2 | 12/2018 | Jung |
| 2012/0206822 A1 | 8/2012 | Hsieh et al. |
| 2016/0131873 A1 | 5/2016 | Tang et al. |
| 2016/0223796 A1 | 8/2016 | Lee et al. |
| 2016/0223797 A1 | 8/2016 | Zhao |
| 2016/0252709 A1 | 9/2016 | Lin et al. |
| 2016/0341933 A1 | 11/2016 | Liu et al. |
| 2017/0068070 A1 | 3/2017 | Tang et al. |
| 2017/0108666 A1 | 4/2017 | Lee |
| 2018/0180851 A1 | 6/2018 | Son |
| 2018/0180852 A1 | 6/2018 | Jung |
| 2019/0265443 A1 | 8/2019 | Kim et al. |
| 2019/0297275 A1 | 9/2019 | Lee et al. |

FOREIGN PATENT DOCUMENTS

| | | |
|---|---|---|
| CN | 107065125 A | 8/2017 |
| CN | 107295256 A | 10/2017 |
| CN | 107479170 A | 12/2017 |
| CN | 207164342 U | 3/2018 |
| CN | 108241203 A | 7/2018 |
| EP | 2 490 061 A1 | 8/2012 |
| KR | 10-2016-0094215 A | 8/2016 |
| KR | 10-2018-0045156 A | 5/2018 |

OTHER PUBLICATIONS

Chinese Office Action Issued on Apr. 2, 2021, in Counterpart to Chinese Patent Application No. 201910628444.2 (10 pages in English and 10 pages in Chinese).

Chinese Office Action issued on Jan. 21, 2022, in counterpart of Chinese Patent Application No. 201910628444.2 (11 pages in English and 9 pages in Chinese).

Korean Office Action Issued on Apr. 3, 2024, in counterpart Korean Patent Application No. 10-2018-0121780 (10 Pages in English, 6 Pages in Korean).

Korean Office Action Issued on Apr. 15, 2024, in counterpart Korean Patent Application No. 10-2023-0035401 (5 Pages in English, 4 Pages in Korean).

| SURFACE NUMBER | K | A | B | C | D | E | F | G | H | J |
|---|---|---|---|---|---|---|---|---|---|---|
| S1 | -0.34208 | 1.10052E-02 | -5.90755E-03 | 3.38729E-02 | -6.19255E-02 | 6.11678E-02 | -3.38829E-02 | 8.96396E-03 | -1.08110E-03 | |
| S2 | 0.00000 | 5.39735E-02 | 5.64176E-02 | -5.28368E-01 | 1.24230E+00 | -1.63330E+00 | 1.25791E+00 | -5.28216E-01 | 9.32768E-02 | |
| S3 | 0.00000 | 6.13317E-02 | 2.29561E-02 | -2.01966E+00 | 7.05195E+00 | -1.49272E+01 | 2.01509E+01 | -1.67268E+01 | 7.77158E+00 | -1.54417E+00 |
| S4 | 2.62806 | 2.46078E-02 | 4.64070E-01 | -4.09678E+00 | 1.97655E+01 | -6.09442E+01 | 1.20474E+02 | -1.47023E+02 | 1.01129E+02 | -3.00775E+01 |
| S5 | 0.00000 | 8.38081E-02 | -4.97270E-02 | 2.37876E+00 | -2.53003E+01 | 1.13321E+02 | -2.85909E+02 | 4.19056E+02 | -3.33240E+02 | 1.11272E+02 |
| S6 | 0.00000 | -2.08709E-01 | 1.49609E+00 | -4.98207E+00 | 2.93755E+00 | 2.98220E+01 | -1.03500E+02 | 1.54098E+02 | -1.12058E+02 | 3.24489E+01 |
| S8 | 0.00000 | -3.07446E-01 | 1.20685E+00 | -1.23165E+00 | -1.10451E+01 | 6.46024E+01 | -1.57507E+02 | 2.02841E+02 | -1.35141E+02 | 3.67604E+01 |
| S9 | 0.00000 | -1.54460E-02 | 3.72603E-01 | -1.39182E+00 | 8.86773E+00 | -3.72768E+01 | 1.00708E+02 | -1.61621E+02 | 1.39131E+02 | -4.94855E+01 |
| S10 | 0.00000 | 4.12613E-02 | -2.94307E-01 | 4.71615E-01 | -3.91259E-01 | 1.36468E-01 | 3.86064E-02 | -5.88240E-02 | 2.28082E-02 | -3.16074E-03 |
| S11 | 0.00000 | -1.14184E-02 | -1.18614E-01 | 1.64411E-01 | -1.79456E-01 | 1.51935E-01 | -8.90894E-02 | 3.29432E-02 | -6.89217E-03 | 6.19744E-04 |
| S12 | 80.60842 | -1.57785E-01 | 2.49619E-01 | -3.23564E-01 | 2.54565E-01 | -1.30294E-01 | 4.50241E-02 | -1.03594E-02 | 1.42576E-03 | -8.75428E-05 |
| S13 | 0.00000 | -1.50993E-01 | 1.55712E-01 | -1.37931E-01 | 8.85705E-02 | -4.15023E-02 | 1.34863E-02 | -2.76353E-03 | 3.14128E-04 | -1.49477E-05 |

FIG. 22

| SURFACE NUMBER | K | A | B | C | D | E | F | G | H | J |
|---|---|---|---|---|---|---|---|---|---|---|
| S1 | -0.34014 | 1.04169E-02 | 3.56880E-03 | -1.25392E-02 | 4.80309E-02 | -8.66573E-02 | 8.11016E-02 | -3.91843E-02 | 7.32590E-03 | |
| S2 | 0.00000 | 6.55229E-02 | -7.32436E-02 | -2.35030E-02 | 1.85933E-01 | -3.19236E-01 | 2.80158E-01 | -1.25826E-01 | 2.31109E-02 | |
| S3 | 0.00000 | 8.24965E-02 | -1.99561E-01 | 7.72523E-01 | -2.83164E+00 | 6.97720E+00 | -1.08497E+01 | 1.02737E+01 | -5.35702E+00 | 1.17811E+00 |
| S4 | 2.25052 | 2.96257E-02 | -2.89213E-03 | 1.61244E-01 | -7.05854E-01 | 1.57239E+00 | -1.52915E+00 | -1.35865E+00 | 4.41332E+00 | -2.73292E+00 |
| S5 | 0.00000 | 3.49505E-02 | -6.80361E-02 | 3.01306E-01 | -2.49844E+01 | 1.04053E+02 | -2.58821E+02 | 3.81784E+02 | -3.07649E+02 | 1.04267E+02 |
| S6 | 0.00000 | -1.60486E-01 | 9.65482E-02 | -3.71867E+00 | 1.10512E+01 | -2.40529E+01 | 3.07011E+01 | -1.87188E+01 | 2.47638E+00 | 1.44530E+02 |
| S8 | 0.00000 | -2.17128E-01 | 7.09064E-01 | -1.73474E+00 | 4.23336E+00 | -6.09906E+00 | 1.21932E+00 | 8.36048E+00 | -9.78780E+00 | 3.36986E+00 |
| S9 | 0.00000 | -3.13047E-04 | 2.51008E-01 | -8.69022E-01 | 4.12821E+00 | 1.21867E+01 | 2.43265E+01 | -3.19542E+01 | 2.46096E+01 | -8.29450E+00 |
| S10 | 0.00000 | 3.52333E-02 | -2.39043E-01 | 2.53158E-01 | 2.34647E-01 | -3.21153E-01 | 3.42640E-01 | -1.78034E-01 | 4.80007E-02 | -5.35185E-03 |
| S11 | 0.00000 | 4.85727E-03 | -1.41555E-01 | 1.89222E-01 | -1.96185E-01 | 1.53565E-01 | -8.29186E-02 | 2.83926E-02 | -5.52484E-03 | 4.63328E-04 |
| S12 | 80.60842 | -1.41756E-01 | 2.19020E-01 | -2.77992E-01 | 2.12362E-01 | -1.04184E-01 | 3.49905E-02 | -7.65177E-03 | 1.01155E-03 | -5.94453E-05 |
| S13 | 0.00000 | -1.53912E-01 | 1.68361E-01 | -1.63610E-01 | 1.14037E-01 | -5.52122E-02 | 1.76907E-02 | -3.48777E-03 | 3.77424E-04 | -1.69860E-05 |

FIG. 25

| SURFACE NUMBER | K | A | B | C | D | E | F | G | H | J |
|---|---|---|---|---|---|---|---|---|---|---|
| S1 | -0.35040 | 9.89878E-03 | 1.33155E-02 | -5.33991E-02 | 1.50440E-01 | -2.35090E-01 | 2.06228E-01 | -9.67600E-02 | 1.82702E-02 | |
| S2 | 0.00000 | 5.11614E-02 | -8.66746E-03 | -1.02776E-01 | 1.82007E-01 | -2.79494E-01 | 2.98195E-01 | -1.67416E-01 | 3.80380E-02 | |
| S3 | 0.00000 | 5.71161E-02 | -1.31916E-02 | 2.15866E-01 | -1.53631E+00 | 4.29084E+00 | -6.93187E+00 | 6.92404E+00 | -3.88552E+00 | 9.31726E-01 |
| S4 | 1.84436 | 3.78245E-03 | 2.90316E-01 | -1.60385E-01 | 7.03652E-01 | -2.22940E+00 | 4.46029E+00 | -5.35574E+00 | 3.56211E+00 | -1.01734E+01 |
| S5 | 0.00000 | 3.11186E-02 | 4.75606E-01 | -2.32024E+00 | 5.00377E+00 | -4.17962E+00 | -1.18911E+00 | 3.98189E+01 | -4.61926E+01 | 1.98821E+01 |
| S6 | 0.00000 | -7.35627E-02 | 8.67300E-01 | -3.96619E+00 | 1.09620E+01 | -2.32728E+01 | 3.47936E+01 | -3.40505E+01 | 2.02345E+01 | -5.54907E+00 |
| S8 | 0.00000 | -1.63880E-01 | -1.14874E-01 | 6.58330E+00 | -5.25190E+01 | 2.29269E+02 | -6.11083E+02 | 9.88314E+02 | -8.91045E+02 | 3.43709E+02 |
| S9 | 0.00000 | -6.47342E-03 | -1.76318E-02 | 1.31173E+00 | -5.56936E+00 | 1.29508E+01 | -1.65691E+01 | 1.13316E+01 | -3.84918E+00 | 5.00569E-01 |
| S10 | 0.00000 | 1.89177E-02 | -2.86506E-01 | 4.50051E-01 | -3.14472E-01 | 9.63385E-03 | 1.57330E-01 | -1.23797E-01 | 4.18715E-02 | -5.45243E-03 |
| S11 | 0.00000 | 5.83821E-03 | -2.03300E-01 | 3.29182E-01 | -3.51227E-01 | 2.58113E-01 | -1.28382E-01 | 4.09371E-02 | -7.53904E-03 | 6.08384E-04 |
| S12 | 80.60842 | -1.13131E-01 | 1.61850E-01 | -1.89662E-01 | 1.37669E-01 | -6.62558E-02 | 2.17788E-02 | -4.70547E-03 | 5.95287E-04 | -3.29484E-05 |
| S13 | 0.00000 | -1.35187E-01 | 1.24605E-01 | -9.08644E-02 | 4.59469E-02 | -1.64517E-02 | 3.96067E-03 | -5.60362E-04 | 3.60743E-05 | -3.49305E-07 |

FIG. 28

OPTICAL IMAGING SYSTEM AND MOBILE ELECTRONIC DEVICE

CROSS-REFERENCE TO RELATED APPLICATION

This application is a continuation of U.S. application Ser. No. 17/710,048 filed on Mar. 31, 2022, which is a continuation of U.S. application Ser. No. 16/421,986 filed on May 24, 2019, now U.S. Pat. No. 11,320,632, which claims the benefit under 35 U.S.C. 119(a) of Korean Patent Application Nos. 10-2018-0121780 filed on Oct. 12, 2018, and 10-2018-0084858 filed on Jul. 20, 2018, in the Korean Intellectual Property Office, the entire disclosures of which are incorporated herein by reference for all purposes.

BACKGROUND

1. Field

This application relates to an optical imaging system and mobile electronic device.

2. Description of the Background

Recently, mobile communications terminals have been provided with camera modules, enabling video calling and image capturing. In addition, as the utilization of camera modules mounted in mobile communications terminals has increased, camera modules for mobile communications terminals have gradually been required to have higher resolution and higher performance.

However, since there is a trend for mobile communications terminals to be gradually miniaturized and lightened, there are limitations in realizing camera modules having high resolution and high performance.

In particular, it is difficult to obtain an optical zoom effect in a camera used in mobile communications terminals due to size limitations, and it is difficult to capture a subject at various distances.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially disposed from an object side, wherein the first lens has negative refractive power, an image side surface thereof is concave, and an angle of view of the optical imaging system including the first lens to the sixth lens is 100° or more. When a focal length of the first lens is f1_1, and a total focal length of the optical imaging system including the first lens to the sixth lens is F1, $1.0 < |f1\_1/F1| < 2.0$ is satisfied.

When a distance from an object side surface of the first lens to an imaging surface of an image sensor is TTL1, $TTL1/F1 > 2.0$ may be satisfied.

When a focal length of the third lens is f3_1, $-1.0 < f3\_1/f1\_1 < 0$ may be satisfied.

When an Abbe number of the first lens is v1_1, and an Abbe number of the second lens is v2_1, $v1\_1 - v2\_1 > 30$ may be satisfied.

$v2\_1 < 26$ may be satisfied.

When an average value of an Abbe number of the third lens and an Abbe number of the fourth lens is AVR(v3_1, v4_1), an average value of an Abbe number of the fifth lens and an Abbe number of the sixth lens is AVR(v5_1, v6_1), the Abbe number of the third lens is v3_1, the Abbe number of the fourth lens is v4_1, the Abbe number of the fifth lens is v5_1, and the Abbe number of sixth lens is v6_1, $AVR(v3\_1, v4\_1) > 55$ and $AVR(v5\_1, v6\_1) < 21$ may be satisfied.

When an average value of the Abbe number of the third lens and the Abbe number of the fifth lens is AVR(v3_1, v5_1), an average value of the Abbe number of the fourth lens and the Abbe number of the sixth lens is AVR(v4_1, v6_1), $AVR(v3\_1, v5\_1) > 55$ and $AVR(v4\_1, v6\_1) < 24$ may be satisfied.

$v2\_1 + v6\_1 < v3\_1$ may be satisfied.

The second lens and the third lens may each have positive refractive power.

The first lens to the sixth lens may be made of a plastic material, and the first lens and the second lens may be made of plastic materials having different optical characteristics from each other.

The fifth lens to the sixth lens may be made of plastic materials having different optical characteristics from each other.

A mobile electronic device may include the optical imaging system, the optical imaging system may further include an image sensor to convert light incident through the first lens to the sixth lens to an electrical signal, and a display unit disposed on a surface of the mobile electronic device to display an image based on the electrical signal.

The mobile electronic device may further include a second optical imaging system comprising a second image sensor, and a third optical imaging system comprising a third image sensor, the optical imaging system, the second optical imaging system, and the third optical imaging systems may have different angles of view from each other, and the display unit may display an image synthesized from the image sensor, the second image sensor, and the third image sensor.

In another general aspect, an optical imaging system includes a first optical imaging system, a second optical imaging system, and a third optical imaging system having different angles of view from each other. Among the first optical imaging system to the third optical imaging system, when an angle of view of an optical imaging system having the widest angle of view is FOV1, and an angle of view of an optical imaging system having the narrowest angle of view is FOV3, $1.5 < FOV1/FOV3 < 4.0$ is satisfied. The optical imaging system having the widest angle of view among the first optical imaging system to the third optical imaging system includes a first lens, a second lens, a third lens, a fourth lens, a fifth lens, and a sixth lens, sequentially disposed from an object side. The first lens has negative refractive power, an image side surface thereof is concave, and an angle of view of an optical imaging system comprising the first lens to the sixth lens is 100° or more. When a focal length of the first lens is f1_1, and a total focal length of the optical imaging system including the first lens to the sixth lens is F1, $1.0 < |f1\_1/F1| < 2.0$ is satisfied.

When a focal length obtained by converting a total focal length of the first optical imaging system into 35 mm format is F1', and a focal length obtained by converting a total focal length of the third optical imaging system into 35 mm format is F3', 2.5≤F3'/F1' may be satisfied.

When a focal length obtained by converting the total focal length of the second optical imaging system into 35 mm format is F2', 1.5≤F2'/F1'≤2.5 may be satisfied.

The optical imaging system may be a mobile electronic device, and may further include a first image sensor to convert light incident through the first lens to the sixth lens to an electrical signal, and a display unit disposed on a surface of the mobile electronic device to display an image based on the electrical signal.

Other features and aspects will be apparent from the following detailed description, the drawings, and the claims.

BRIEF DESCRIPTION OF DRAWINGS

FIG. 22 shows aspherical surface coefficients for each surface of a first lens to a sixth lens of the third optical imaging system illustrated in FIG. 21.

FIG. 25 shows aspherical surface coefficients for each surface of a first lens to a sixth lens of the third optical imaging system illustrated in FIG. 24.

FIG. 28 shows aspherical surface coefficients for each surface of a first lens to a sixth lens of the third optical imaging system illustrated in FIG. 27.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
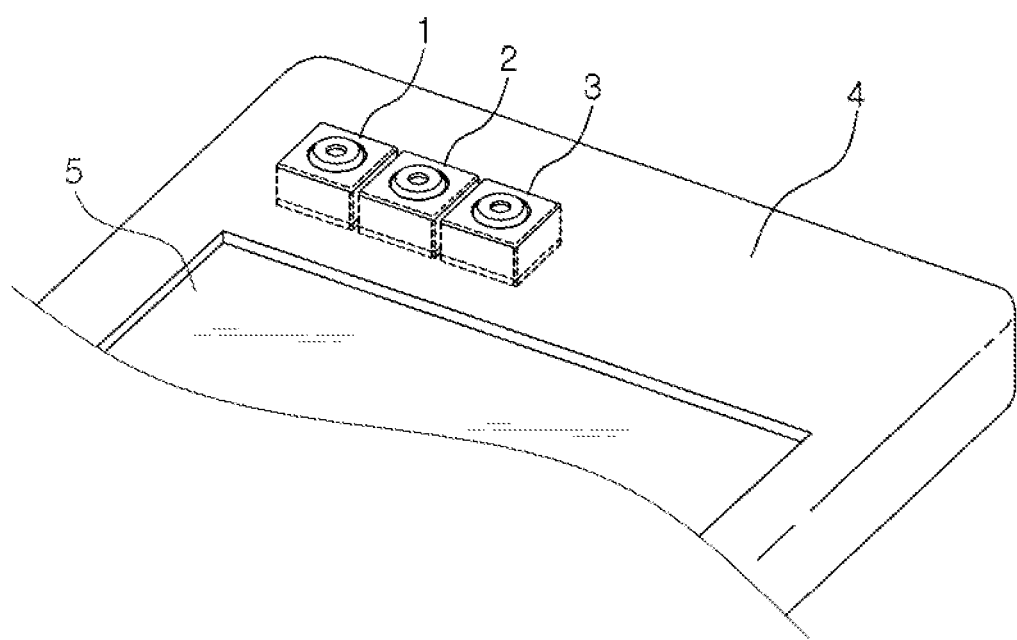
FIG. 1 is a perspective view of a mobile electronic device according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples, and similarly, the second member, component, region, layer, or section may also be referred to as a first member, component, region, layer, or section.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

In the following lens configuration diagrams, thicknesses, sizes and sizes of lenses have been slightly exaggerated for convenience of explanation. Particularly, shapes of spherical surfaces or aspherical surfaces suggested in the lens configuration diagrams are suggested by way of example. The shapes of the spherical surfaces or the aspherical surfaces are not limited to those illustrated in the lens configuration diagrams.

In addition, in each lens, a first surface may refer to a surface close to an object side (an object-side surface) and a second surface may refer to a surface close to an image side (an image-side surface). In addition, in the present specification, numerical values of a radius of curvature, a thickness, a distance, a focal length, and the like of a lens may all be in mm, and an unit of an angle is in degrees.

In an explanation of a shape of each lens, a convex shape of one surface may mean that a paraxial region of the surface may be convex, and a concave shape of one surface may mean that a paraxial region of the surface may be concave. Therefore, even when one surface of the lens is described as a convex shape, an edge portion of the lens may be concave. Similarly, even when one surface of the lens is described as a concave shape, an edge portion of the lens may be convex.

The paraxial region may mean a narrow region near and including an optical axis.

Meanwhile, an aspherical surface of a lens may be represented by following Equation 1.

$$Z = \frac{cY^2}{1 + \sqrt{1 - (1+K)c^2Y^2}} + AY^4 + BY^6 + CY^8 + DY^{10} + EY^{12} + FY^{14} + GY^{16} + HY^{18} + \ldots \quad \text{[Equation 1]}$$

where c is a curvature of a lens (a reciprocal of a radius of curvature), k is a conic constant, and Y is a distance from an arbitrary point on an aspherical surface of a lens to an optical axis. Further, constants A to H may mean aspherical constants. Z (or SAG) may represent a distance from an arbitrary point on an aspherical surface of a lens to an apex of the aspherical surface in a direction of the optical axis.

An aspect of the present disclosure is to provide an optical imaging system having a wide angle of view and being bright. Another aspect of the present disclosure is to provide an optical imaging system capable of capturing a subject at various distances.

Referring to FIG. 1, a mobile electronic device 4 according to an embodiment of the present disclosure may be provided with a display 5 and an optical imaging system, and the optical imaging system may include a plurality of optical imaging systems. In addition, respective optical imaging systems may include a plurality of lenses.

For example, the optical imaging system of the mobile electronic device 4 may be provided with a first optical imaging system 1, a second optical imaging system 2 and a third optical imaging system 3.

The first optical imaging system 1, the second optical imaging system 2 and the third optical imaging system 3 may be configured to have different angles of view from each other.

The first optical imaging system 1 may be configured to have the widest angle of view (for example, a wide angle lens) and the third optical imaging system 3 may be configured to have the narrowest angle of view (for example, a telephoto lens). The second optical imaging system 2 may have a narrower angle of view than the first optical imaging system 1 and may have a wider angle of view than the third optical imaging system 3.

As an example, an angle of view (FOV1) of the first optical imaging system 1 may be FOV1≥100°, an angle of view (FOV2) of the second optical imaging system 2 may be 70° ≤ FOV2<100° and an angle of view (FOV3) of the third optical imaging system 3 may be FOV3<54°. Meanwhile, the angle of view (FOV2) of the second optical imaging system 2 may be 60° ≤ FOV2<100°.

In addition, TTL/F of the first optical imaging system 1 and the second optical imaging system 2 may be 1.0 or more, respectively, and TTL/F of the third optical imaging system 3 may be less than 1.0. Here, TTL may be a distance from an object side of a first lens of each optical imaging system to an imaging surface of an image sensor, and F may be a total focal length of each optical imaging system.

By implementing angles of view of the three optical imaging systems to be different from each other, an image of a subject may be captured at various distances, and a zoom function may be realized.

For example, an optical zoom effect for the same subject may be obtained by converting between the first optical imaging system 1, the second optical imaging system 2, and the third optical imaging system 3.

In addition, since three images for one subject may be used (for example, synthesized) to generate a high-resolution image or a bright image, an image of a subject may be clearly captured even in a low-light environment.

The first optical imaging system 1 to the third optical imaging system 3 may satisfy the following conditional expressions.

$1.5 < FOV1/FOV3 < 4.0$ [Conditional Expression 1]

$2.5 \leq F3'/F1'$ [Conditional Expression 2]

$1.5 \leq F2'/F1' \leq 2.5$ [Conditional Expression 3]

In the conditional expressions, FOV1 may represent the angle of view of the first optical imaging system 1, FOV3 may represent the angle of view of the third optical imaging system 3, F1' may represent a focal length in which the total focal length of the first optical imaging system 1 is converted into 35 mm format (based on an image sensor size of a 35 mm film camera), F2' may represent a focal length in which the total focal length of the second optical imaging system 2 is converted into 35 mm format and F3' may represent a focal length in which the total focal length of the third optical imaging system 3 is converted into 35 mm format.

Table 1 shows examples of the total focal length and the converted focal length of each embodiment of the first optical imaging system 1, the second optical imaging system 2, and the third optical imaging system 3. In Table 1, F represents the total focal length of each embodiment, and F' represents the focal length converted based on the image sensor size of the 35 mm film camera. The units may be mm.

TABLE 1

|  | Embodiment | F | F' |
|---|---|---|---|
| First optical imaging system (1) | 1 | 2.21 | 16.43 |
|  | 2 | 2.14 | 15.91 |
|  | 3 | 1.837 | 13.66 |
|  | 4 | 1.804 | 13.46 |
|  | 5 | 1.804 | 13.46 |
|  | 6 | 1.8 | 13.43 |
| Second optical imaging system (2) | 1 | 4.3 | 25.14 |
|  | 2 | 4.31 | 25.20 |
|  | 3 | 4.29 | 25.02 |
| Third optical imaging system (3) | 1 | 5.997 | 49.71 |
|  | 2 | 6.001 | 48.08 |
|  | 3 | 6.001 | 49.55 |

Hereinafter, the first optical imaging system 1 will be described with reference to FIGS. 2 to 13.

The first optical imaging system 1 may satisfy at least one of the following conditional expressions.

$FOV1 \geq 1000$ [Conditional Expression 4]

$Fno1 \leq 2.4$ [Conditional Expression 5]

$TTL1/F1 > 2.0$ [Conditional Expression 6]

$1.0 < |f1\_1/F1| < 2.0$ [Conditional Expression 7]

$-1.0 < f3\_1/f1\_1 < 0$ [Conditional Expression 8]

$0.5 < R2\_1/F1 < 2.0$ [Conditional Expression 9]

$v2\_1 < 26$ [Conditional Expression 10]

$v1\_1 - v2\_1 > 30$ [Conditional Expression 11]

$AVR(v3\_1, v4\_1) > 55$ [Conditional Expression 12]

$AVR(v5\_1, v6\_1) < 21$ [Conditional Expression 13]

$AVR(v3\_1, v5\_1) > 55$ [Conditional Expression 14]

$AVR(v4\_1, v6\_1) < 24$ [Conditional Expression 15]

$v2\_1 + v6\_1 < v3\_1$ [Conditional Expression 16]

TTL1 may be a distance from an object side of the first lens of the first optical imaging system 1 to an imaging surface of an image sensor, F1 may be a total focal length of the first optical imaging system 1, f1_1 may be a focal length of the first lens of the first optical imaging system 1, f3_1 may be a focal length of the third lens of the first optical imaging system 1, R2_1 may be a radius of curvature of image side surface of the first lens of the first optical imaging system 1, v1_1 may be an Abbe number of the first lens of the first optical imaging system 1, v2_1 may be an Abbe number of the second lens of the first optical imaging system 1, v3_1 may be an Abbe number of the third lens of the first optical imaging system 1, v4_1 may be an Abbe number of the fourth lens of the first optical imaging system 1, v5_1 may be an Abbe number of the fifth lens of the first optical imaging system 1, and v6_1 may be an Abbe number of the sixth lens of the first optical imaging system 1.

In addition, AVR(v3_1, v4_1) may be an average value of the Abbe number of the third lens and the Abbe number of the fourth lens, AVR(v5_1, v6_1) may be an average value of the Abbe number of the fifth lens and the Abbe number of the sixth lens, AVR(v3_1, v5_1) may be an average value of the Abbe number of the third lens and the Abbe number of the fifth lens, and AVR(v4_1, v6_1) may be an average value of the Abbe number of the fourth lens and the Abbe number of the sixth lens.

Figure 2:
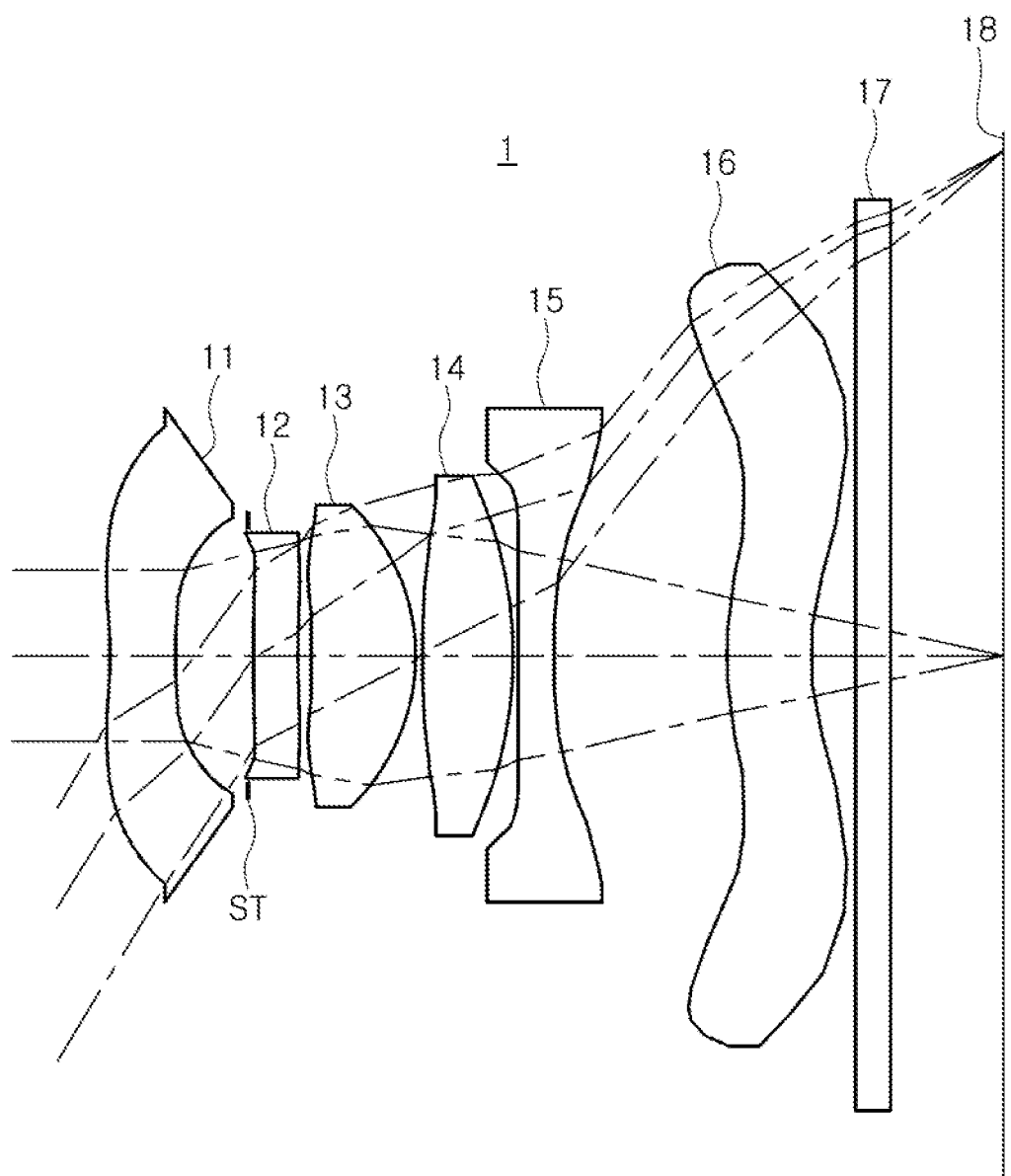
FIG. 2 is a configuration diagram of a first optical imaging system according to a first embodiment of the present disclosure.
Figure 3:
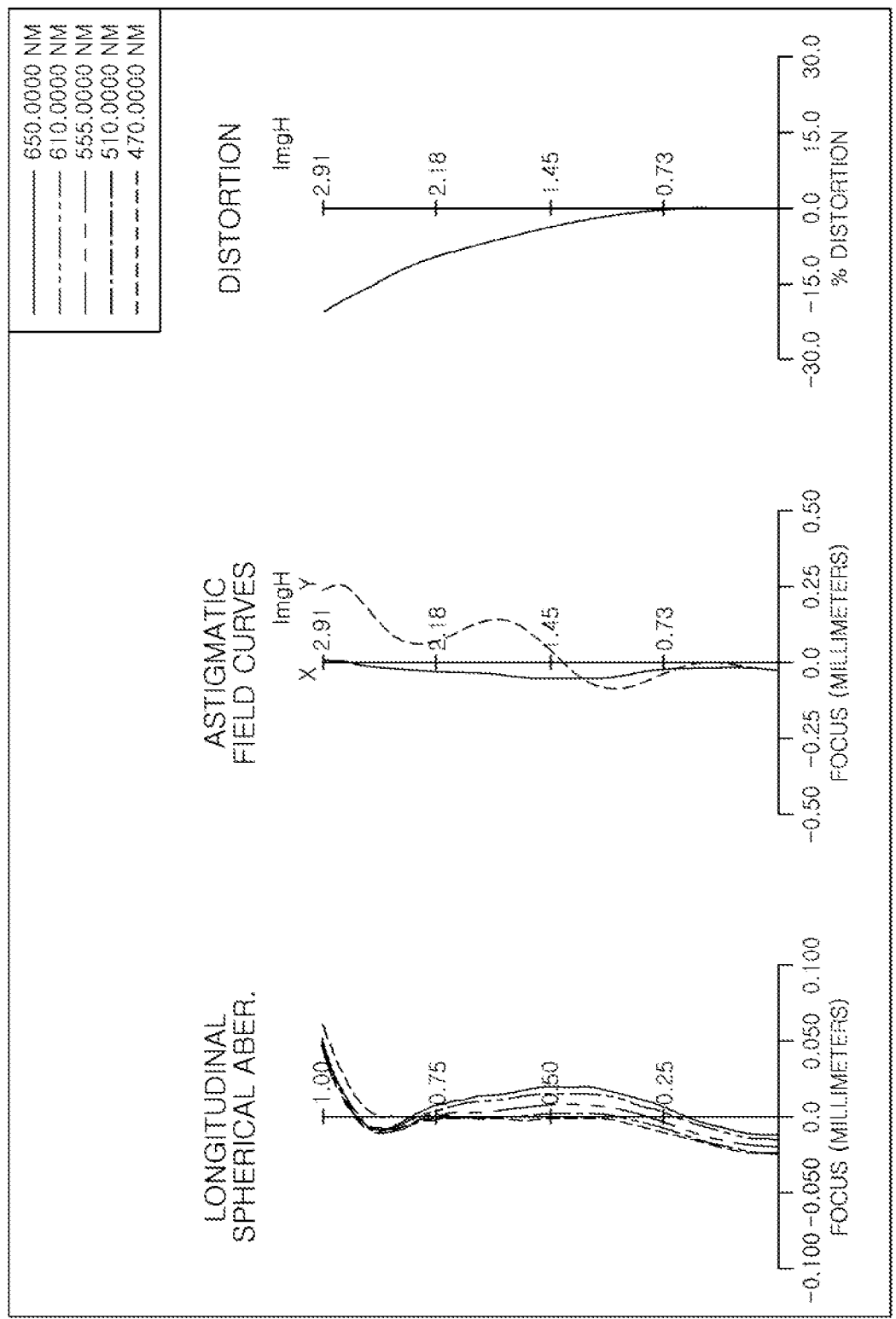
FIG. 3 is a curve representing aberration characteristics of the first optical imaging system illustrated in FIG. 2.

Referring to FIGS. 2 and 3, a first embodiment of the first optical imaging system 1 of the present disclosure may include an optical system including a first lens 11, a second lens 12, a third lens 13, a fourth lens 14, a fifth lens 15 and a sixth lens 16, and may further include an infrared block filter 17 (hereinafter, referred to as a 'filter') and an image sensor 18.

The first lens 11 to the sixth lens 16 may be disposed to be spaced apart from each other by a predetermined distance along an optical axis, respectively. The first lens 11 to the sixth lens 16 may be formed of a plastic material.

Table 2 illustrates lens characteristics (a radius of curvature, a thickness of a lens, or a distance between lenses, a refractive index, an Abbe number, and a focal length) of respective lenses.

TABLE 2

| Surface number | Reference | Radius of curvature | Thickness or Distance | Refractive index | Abbe number | Focal length |
|---|---|---|---|---|---|---|
| S1 | First lens | −3.361 | 0.375 | 1.544 | 56.1 | −3.318 |
| S2 |  | 4.083 | 0.457 |  |  |  |
| S3 | Second lens | 4.37854 | 0.250 | 1.639 | 23.5 | 8.197 |
| S4 |  | 25.098 | 0.084 |  |  |  |
| S5 | Third lens | −3.327 | 0.599 | 1.544 | 56.1 | 2.729 |
| S6 |  | −1.094 | 0.030 |  |  |  |
| S7 | Fourth lens | 4.400 | 0.519 | 1.544 | 56.1 | 2.816 |
| S8 |  | −2.265 | 0.030 |  |  |  |
| S9 | Fifth lens | −5.879 | 0.200 | 1.671 | 19.2 | −3.339 |
| S10 |  | 3.727 | 0.993 |  |  |  |
| S11 | Sixth lens | 1.905 | 0.483 | 1.65 | 21.5 | −15.765 |
| S12 |  | 1.447 | 0.251 |  |  |  |
| S13 | Filter | Infinity | 0.210 | 1.517 | 64.2 |  |
| S14 |  | Infinity | 0.620 |  |  |  |
| S15 | Imaging surface | Infinity | 0.02000 |  |  |  |

Meanwhile, in the first optical imaging system 1, the total focal length F1 may be 2.21 mm, the angle of view FOV1 may be 117.4°, Fno1 may be 2.2, TTL1 may be 5.12 mm, and BFL1 may be 1.101 mm.

Here, Fno1 may be a number (f-number) representing brightness of the first optical imaging system, TTL1 may be a distance from the object side surface of the first lens 11 of the first optical imaging system 1 to the imaging surface of the image sensor 18, and BFL1 may be a distance from the image side surface of the sixth lens 16 of the imaging surface of the image sensor 18.

In the first embodiment of the first optical imaging system 1, the first lens 11 may have negative refractive power, and first and second surfaces of the first lens 11 may be concave in a paraxial region.

In addition, at least one inflection point may be formed on the first surface of the first lens 11. For example, the first surface of the first lens 11 may be concave in the paraxial region and may be convex toward an edge.

The second lens 12 may have positive refractive power, a first surface of the second lens 12 may be convex in a paraxial region and a second surface of the second lens 12 may be concave in the paraxial region.

The first lens 11 and the second lens 12 may be formed of plastic materials having different optical characteristics from each other. As an example, the Abbe number of the first lens 11 and the second lens 12 may be different from each other.

A stop ST may be disposed between the first lens 11 and the second lens 12.

The third lens 13 may have positive refractive power, a first surface of the third lens 13 may be concave in a paraxial region, and a second surface of the third lens 13 may be convex in the paraxial region.

The second lens 12 and the third lens 13 may be formed of plastic materials having different optical characteristics from each other. As an example, the Abbe number of the second lens 12 and the third lens 13 may be different from each other.

The fourth lens 14 may have positive refractive power, and first and second surfaces of the fourth surface 4 may be convex in a paraxial region.

The fifth lens 15 may have negative refractive power, and first and second surfaces of the fifth lens 15 may be concave in a paraxial region.

The sixth lens 16 may have negative refractive power, and a first surface of the sixth lens 16 may be convex in a paraxial region, and a second surface of the sixth lens 16 may be concave in the paraxial region.

In addition, at least one inflection point may be formed on the first surface and the second surface of the sixth lens 16. For example, the first surface of the sixth lens 16 may be convex in the paraxial region, and may be concave toward an edge. The second surface of the sixth lens 16 may be concave in the paraxial region and may be concave toward the edge.

Meanwhile, the fifth lens 15 and the sixth lens 16 may be formed of plastic materials having different optical characteristics from each other. As an example, the Abbe number of the fifth lens 15 and the sixth lens 16 may be different from each other. In addition, the Abbe number of the fifth lens 15 and the sixth lens 16 may be 22 or less.

Meanwhile, object side surfaces and image side surfaces of the first lens 11 to the sixth lens 16 may all be aspherical surfaces. For example, each surface of the first lens 11 to the sixth lens 16 may have an aspherical surface coefficient as shown in Table 3.

TABLE 3

|  | K | A | B | C | D | E | F | G | H |
|---|---|---|---|---|---|---|---|---|---|
| S1 | 0.383517 | 0.509874 | −0.76166 | 1.228256 | −1.53364 | 1.315349 | −0.70922 | 0.214811 | −0.02765 |
| S2 | 15.75935 | 0.391738 | 3.988743 | −32.3712 | 136.6511 | −324.331 | 424.4204 | −263.113 | 45.62338 |
| S3 | −12.8954 | −0.05628 | −0.36079 | −0.79442 | 3.085484 | −22.6953 | 54.94171 | −47.9911 | 0 |
| S4 | 99 | 0.17198 | −1.2445 | 11.07723 | −49.7164 | 115.2839 | −143.356 | 75.35661 | 0 |
| S5 | −35.1844 | 0.067687 | 0.421988 | 1.563292 | −4.95337 | 1.194026 | 6.22432 | −4.54715 | 0 |
| S6 | 0.354807 | 0.209891 | −1.03819 | 3.221125 | −0.79106 | −18.3475 | 48.3397 | −50.0839 | 19.27644 |
| S7 | −38.4699 | 0.126642 | −0.93239 | 2.884888 | −5.0212 | 5.27206 | −3.01827 | 0.684177 | 0 |
| S8 | 2.708338 | 0.584433 | −2.97325 | 7.83848 | −11.4932 | 8.588369 | −1.18423 | −2.30266 | 1.027511 |
| S9 | 0.149678 | 0.615758 | −1.95322 | 3.856699 | −4.28251 | 1.105887 | 2.554504 | −2.62588 | 0.763076 |
| S10 | 1.112265 | 0.187466 | 0.008211 | −0.45112 | 0.582211 | −0.36362 | 0.117567 | −0.0157 | 0 |
| S11 | −6.56077 | −0.12142 | −0.00555 | 0.03359 | −0.02194 | 0.007567 | −0.0013 | 8.8E−05 | 0 |
| S12 | −0.74052 | −0.24748 | 0.103115 | −0.03794 | 0.00942 | −0.00144 | 0.000105 | −1.6E−06 | 0 |

In addition, an optical imaging system thus configured may have aberration characteristics as shown in FIG. 3.

Figure 4:
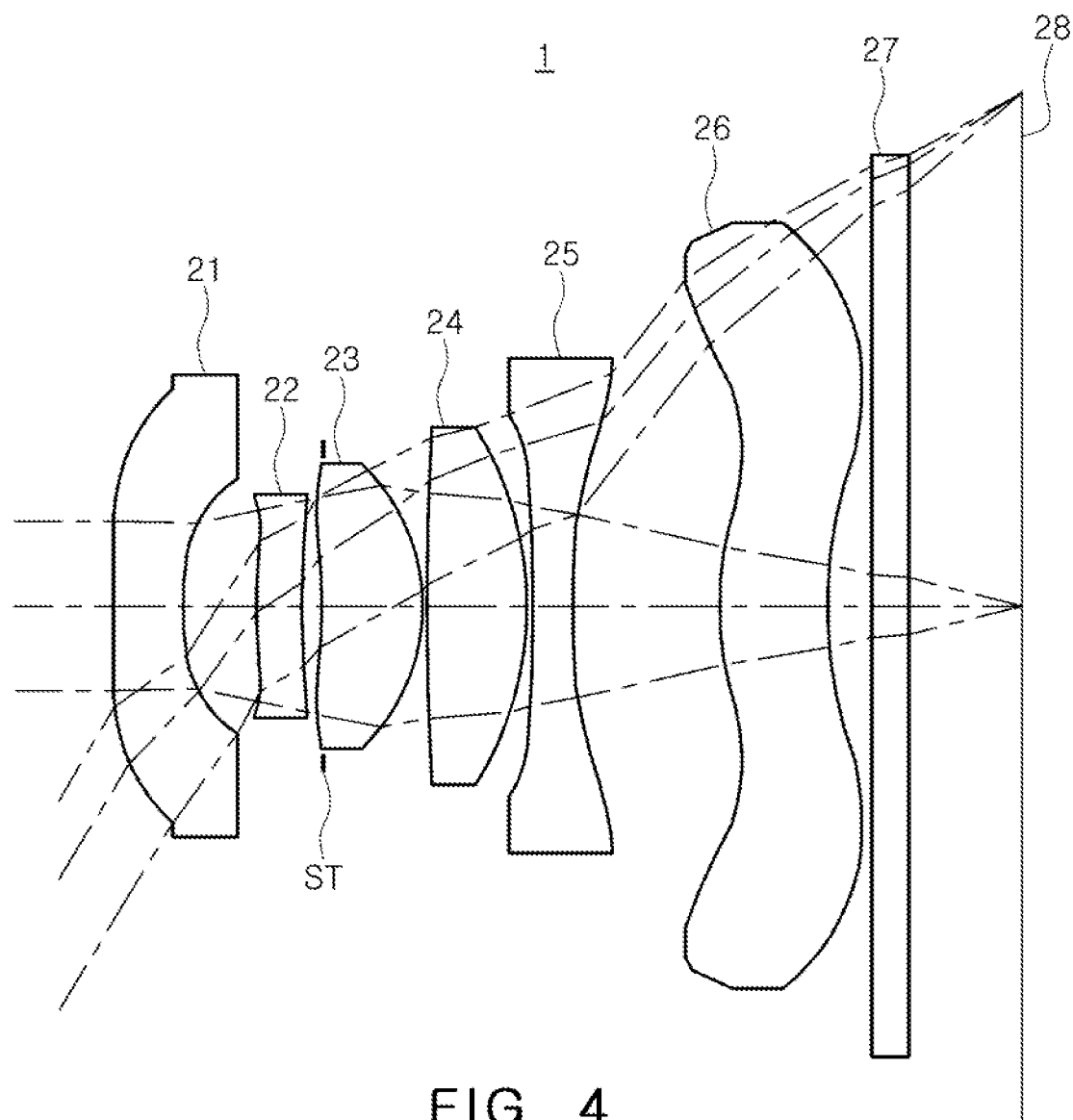
FIG. 4 is a configuration diagram of the first optical imaging system according to a second embodiment of the present disclosure.
Figure 5:
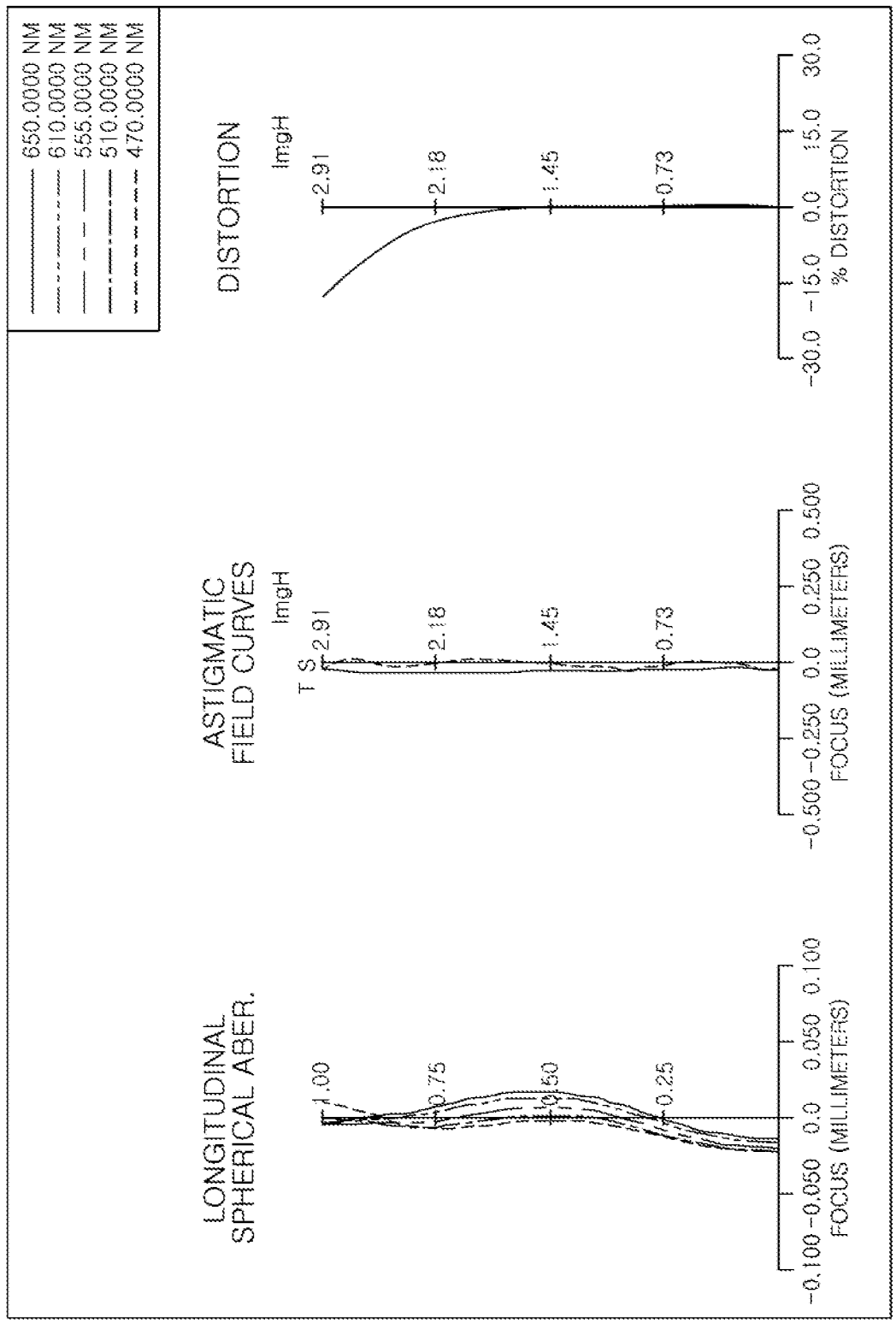
FIG. 5 is a curve representing aberration characteristics of the first optical imaging system illustrated in FIG. 4.

Referring to FIGS. 4 and 5, according to a second embodiment of the present disclosure, a first optical imaging system 1 may include an optical imaging system including a first lens 21, a second lens 22, a third lens 23, a fourth lens 24, a fifth lens 25, and a sixth lens 26, sequentially disposed from an object side, and may further include a filter 27 and an image sensor 28.

The first lens 21 to the sixth lens 26 may be disposed to be spaced apart from each other by a predetermined distance along an optical axis, respectively. The first lens 21 to the sixth lens 26 may be formed of a plastic material.

Table 4 shows lens characteristics (a radius of curvature, a thickness of a lens, a distance between lenses, a refractive index, an Abbe number, and a focal length) of each lens.

TABLE 4

| Surface number | Reference | Radius of curvature | Thickness or Distance | Refractive index | Abbe number | Focal length |
|---|---|---|---|---|---|---|
| S1 | First lens | −8.183 | 0.404 | 1.544 | 56.1 | −3.390 |
| S2 | | 2.433 | 0.414 | | | |
| S3 | Second lens | 4.40088 | 0.262 | 1.65 | 21.5 | 9.820 |
| S4 | | 13.576 | 0.085 | | | |
| S5 | Third lens | −3.667 | 0.582 | 1.544 | 56.1 | 2.582 |
| S6 | | −1.075 | 0.030 | | | |
| S7 | Fourth lens | 5.618 | 0.546 | 1.544 | 56.1 | 2.545 |
| S8 | | −1.782 | 0.049 | | | |
| S9 | Fifth lens | −2.38070 | 0.220 | 1.661 | 20.35 | −2.781 |
| S10 | | 8.69914 | 0.835 | | | |
| S11 | Sixth lens | 1.664 | 0.586 | 1.65 | 21.5 | 72.707 |
| S12 | | 1.484 | 0.258 | | | |
| S13 | Filter | Infinity | 0.210 | 1.517 | 64.2 | |
| S14 | | Infinity | 0.621 | | | |
| S15 | Imaging surface | Infinity | 0.02000 | | | |

Meanwhile, in the first optical imaging system 1, the total focal length F1 may be 2.14 mm, the angle of view FOV1 may be 117°, Fno1 may be 2.26, TTL1 may be 5.121 mm, and BFL1 may be 1.109 mm.

In the second embodiment of the first optical imaging system 1, the first lens 21 may have negative refractive power, and first and second surfaces of the first lens 21 may be concave in a paraxial region.

In addition, at least one inflection point may be formed on the first surface of the first lens 21. For example, the first surface of the first lens 21 may be concave in the paraxial region and may be convex toward an edge.

The second lens 22 may have positive refractive power, the first surface of the second lens 22 may be convex in the paraxial region, and the second surface of the second lens 22 may be concave in the paraxial region.

The first lens 21 and the second lens 22 may be formed of plastic materials having different optical characteristics from each other. As an example, the Abbe number of the first lens 21 and the second lens 22 may be different from each other.

The third lens 23 may have positive refractive power, a first surface of the third lens 23 may be concave in a paraxial region, and a second surface of the third lens 23 may be convex in the paraxial region.

The second lens 22 and the third lens 23 may be formed of plastic materials having different optical characteristics from each other. As an example, the Abbe numbers of the second lens 22 and the third lens 23 may be different from each other.

A stop ST may be disposed between the second lens 22 and the third lens 23.

The fourth lens 24 may have positive refractive power, and first and second surfaces of the fourth lens 24 may be convex in a paraxial region.

The fifth lens 25 may have negative refractive power, and first and second surfaces of the fifth lens 25 may be concave in a paraxial region.

The sixth lens 26 may have positive refractive power, a first surface of the sixth lens 26 may be convex in a paraxial region, and a second surface of the sixth lens 26 may be concave in the paraxial region.

In addition, at least one inflection point may be formed on the first and second surfaces of the sixth lens 26. For example, the first surface of the sixth lens 26 may be convex in the paraxial region and may be concave toward an edge. The second surface of the sixth lens 26 may be concave in the paraxial region and may be convex toward the edge.

Meanwhile, the fifth lens 25 and the sixth lens 26 may be formed of plastic materials having different optical characteristics from each other. As an example, the Abbe number of the fifth lens 25 and the sixth lens 26 may be different from each other. In addition, the Abbe number of the fifth lens 25 and the sixth lens 26 may be 22 or less.

Meanwhile, object side surfaces and image side surfaces of the first lens 21 to the sixth lens 26 may all be aspherical surfaces. For example, respective surfaces of the first lens 21 to the sixth lens 26 may have aspherical surface coefficients as shown in Table 5.

TABLE 5

| | K | A | B | C | D | E | F | G |
|---|---|---|---|---|---|---|---|---|
| S1 | 0 | 0.417375 | −0.50416 | 0.630108 | −0.56681 | 0.333316 | −0.11294 | 0.017182 |
| S2 | 3.437091 | 0.681586 | 0.169306 | −6.39824 | 40.46252 | −120.254 | 185.2559 | −118.319 |
| S3 | 0 | −0.06345 | −0.56035 | 5.073793 | −57.4869 | 277.9519 | −688 | 674.4575 |
| S4 | 0 | 0.120851 | 0.218756 | −3.10847 | 20.29634 | −71.2031 | 111.7326 | −65.5863 |
| S5 | −33.5067 | 0.101666 | 0.42272 | −1.89908 | 17.66911 | −59.5811 | 83.57319 | −42.803 |
| S6 | 0.419298 | −0.10736 | 0.81216 | −3.00489 | 9.711379 | −18.9891 | 21.22636 | −9.00593 |
| S7 | −252.971 | −0.05899 | 0.070133 | −0.73876 | 2.83771 | −4.78613 | 3.897587 | −1.24087 |
| S8 | 1.156652 | 0.642046 | −2.23005 | 4.0212 | −4.57893 | 3.572002 | −1.87938 | 0.539453 |
| S9 | 1 | 0.82133 | −1.75515 | 2.578652 | −2.8132 | 2.044485 | −0.97817 | 0.244166 |
| S10 | 0 | 0.144303 | 0.22809 | −0.63909 | 0.550139 | −0.2241 | 0.040006 | −0.00164 |
| S11 | −8.7844 | −0.05242 | −0.09475 | 0.068483 | −0.02537 | 0.007137 | −0.00129 | 9.92E−05 |
| S12 | −0.81081 | −0.20422 | 0.059903 | −0.01304 | 0.000771 | 0.000437 | −0.00013 | 1.08E−05 |

In addition, an optical imaging system thus configured may have aberration characteristics shown in FIG. 5.

Figure 6:
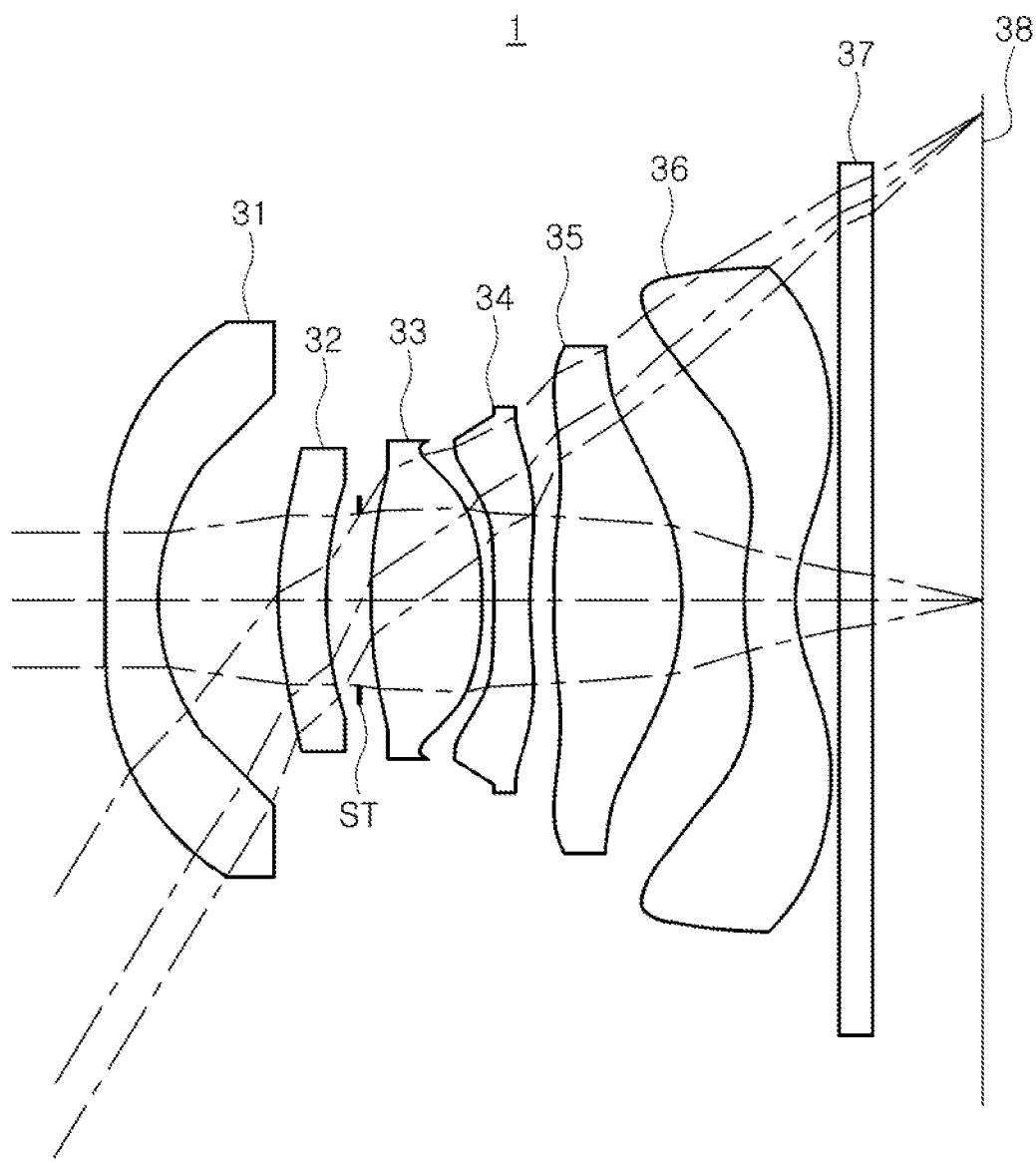
FIG. 6 is a configuration diagram of the first optical imaging system according to a third embodiment of the present disclosure.
Figure 7:
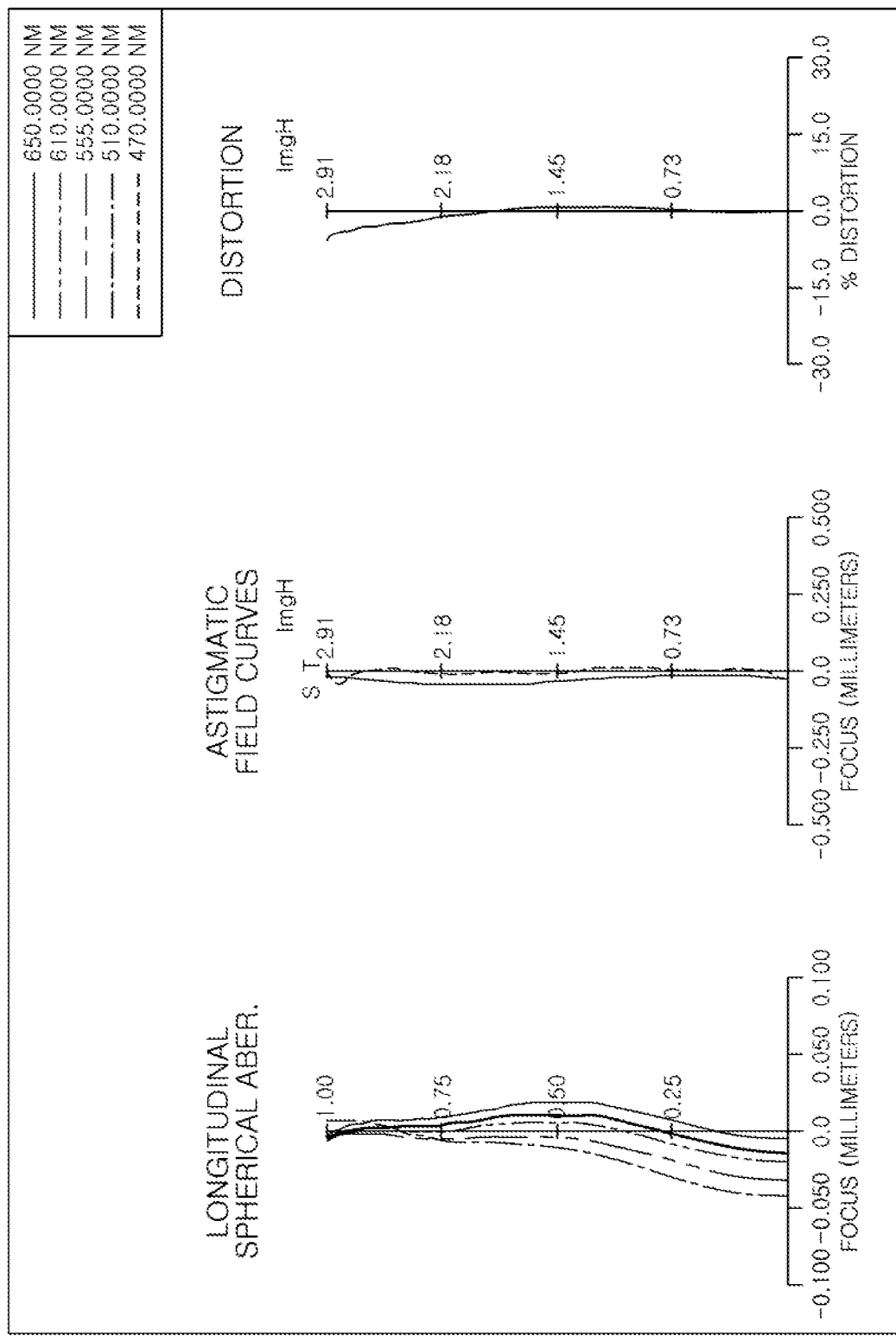
FIG. 7 is a curve representing aberration characteristics of the first optical imaging system illustrated in FIG. 6.

Referring to FIGS. 6 and 7, according to a third embodiment of the present disclosure, the first optical imaging system 1 may include an optical system including a first lens 31, a second lens 32, a third lens 33, a fourth lens 34, a fifth lens 35 and a sixth lens 36, sequentially disposed from an object side, and may further include a filter 37 and an image sensor 38.

The first lens 31 to the sixth lens 36 may be disposed to be spaced from each other by a predetermined distance along an optical axis, respectively. The first lens 31 to the sixth lens 36 may be formed of a plastic material.

Table 6 illustrates lens characteristics (a radius of curvature, a thickness of a lens or a distance between lenses, a refractive index, an Abbe number, and a focal length) of each lens.

TABLE 6

| Surface number | Reference | Radius of curvature | Thickness or Distance | Refractive index | Abbe number | Focal length |
|---|---|---|---|---|---|---|
| S1 | First lens | −12.707 | 0.300 | 1.544 | 56.1 | −3.362 |
| S2 | | 2.166 | 0.709 | | | |
| S3 | Second lens | 1.63231 | 0.292 | 1.614 | 25.9 | 6.939 |
| S4 | | 2.450 | 0.197 | | | |
| S5 | Stop | Infinity | 0.070 | | | |
| S6 | Third lens | 4.042 | 0.653 | 1.544 | 56.1 | 2.666 |
| S7 | | −2.149 | 0.070 | | | |
| S8 | Fourth lens | −12.299 | 0.220 | 1.671 | 19.2 | −6.606 |
| S9 | | 7.11924 | 0.134 | | | |
| S10 | Fifth lens | 4.95200 | 0.755 | 1.544 | 56.1 | 2.083 |
| S11 | | −1.399 | 0.373 | | | |
| S12 | Sixth lens | 1.341 | 0.300 | 1.614 | 25.9 | −3.106 |
| S13 | | 0.72272 | 0.257 | | | |
| S14 | Filter | Infinity | 0.210 | 1.517 | 64.2 | |
| S15 | | Infinity | 0.620 | | | |
| S16 | Imaging surface | Infinity | 0.02000 | | | |

Meanwhile, in the first optical imaging system 1, the total focal length F1 may be 1.837 mm, the angle of view FOV1 may be 117.8°, Fno1 may be 2.25, TTL1 may be 5.18 mm and, BFL1 may be 0.85 mm.

In a third embodiment of the first optical imaging system 1, the first lens 31 may have negative refractive power, and first and second surfaces of the first lens 31 may be concave in a paraxial region.

At least one inflection point may be formed on the first surface of the first lens 31. For example, the first surface of the first lens 31 may be concave in the paraxial region and may be convex toward an edge.

The second lens 32 may have positive refractive power, a first surface of the second lens 32 may be convex in the paraxial region and a second surface of the second lens 32 may be concave in the paraxial region.

The first lens 31 and the second lens 32 may be formed of plastic materials having different optical characteristics from each other. As an example, the Abbe number of the first lens 31 and the second lens 32 may be different from each other.

The third lens 33 may have positive refractive power, and first and second surfaces of the third lens 33 may be convex in a paraxial region.

The second lens 32 and the third lens 33 may be formed of plastic materials having different optical characteristics from each other. As an example, the Abbe number of the second lens 32 and the third lens 33 may be different from each other.

A stop ST may be disposed between the second lens 32 and the third lens 33.

The fourth lens 34 may have negative refractive power, first and second surfaces of the fourth lens 34 may be concave in a paraxial region.

The fifth lens 35 may have positive refractive power, first and second surfaces of the fifth lens 35 may be convex in a paraxial region.

The sixth lens 36 may have negative refractive power, and a first surface of the sixth lens 36 may be convex in a paraxial region and a second surface of the sixth lens 36 may be concave in the paraxial region.

In addition, at least one inflection point may be formed on the first and second surfaces of the sixth lens 36. For example, the first surface of the sixth lens 36 may be convex in the paraxial region and may be concave toward an edge. The second surface of the sixth lens 36 may be concave in the paraxial region and may be convex toward the edge.

Meanwhile, the fifth lens 35 and the sixth lens 36 may be formed of plastic materials having different optical characteristics from each other. As an example, the Abbe number of the fifth lens 35 and the sixth lens 36 may be different from each other. In addition, the Abbe number of the sixth lens 36 may be 26 or less.

Meanwhile, object side surfaces and image side surfaces of the first lens 31 to the sixth lens 36 may all be aspherical surfaces. For example, each surface of the first lens 31 to the sixth lens 36 may have an aspherical surface coefficient as shown in Table 7.

TABLE 7

| | K | A | B | C | D | E | F | G | H |
|---|---|---|---|---|---|---|---|---|---|
| S1 | 0 | 0.37507 | −0.45440 | 0.48627 | −0.38104 | 0.20497 | −0.07064 | 0.01400 | −0.00121 |
| S2 | 0.51564 | 0.47998 | −0.52098 | 0.57001 | −0.39538 | 0.09559 | 0 | 0 | 0 |
| S3 | −2.93220 | −0.00537 | −0.14092 | −0.60218 | 1.28988 | −0.65548 | 0 | 0 | 0 |
| S4 | 9.17220 | −0.05165 | −0.28642 | −0.01159 | 1.51178 | −1.11276 | 0 | 0 | 0 |
| S6 | 19.98604 | −0.01047 | 0.03335 | −0.22807 | 0.17626 | 0 | 0 | 0 | 0 |
| S7 | 3.74495 | 0.05373 | −3.02475 | 15.96820 | −49.52659 | 88.38501 | −88.17166 | 43.81596 | −7.03388 |
| S8 | 139.06889 | 0.02332 | −3.33453 | 15.66493 | −43.87823 | 75.23525 | −84.79839 | 60.08267 | −19.54198 |
| S9 | 0 | 0.01770 | −1.65750 | 6.21598 | −12.63317 | 15.11076 | −10.81219 | 4.41980 | −0.80714 |
| S10 | −15.57041 | 0.05751 | −0.65490 | 1.46125 | −1.69379 | 1.09038 | −0.38011 | 0.06401 | −0.00357 |
| S11 | −0.52500 | 0.01203 | 0.29322 | −0.76574 | 1.04146 | −0.75964 | 0.31025 | −0.06784 | 0.00625 |
| S12 | −16.35061 | −0.39724 | 0.11990 | 0.08823 | −0.11480 | 0.05442 | −0.01152 | 0.00073 | 0.00004 |
| S13 | −4.77091 | −0.28041 | 0.21129 | −0.11309 | 0.04180 | −0.01075 | 0.00184 | −0.00019 | 0.00001 |

The optical imaging system thus configured may have aberration characteristics as shown in FIG. 7.

Figure 8:
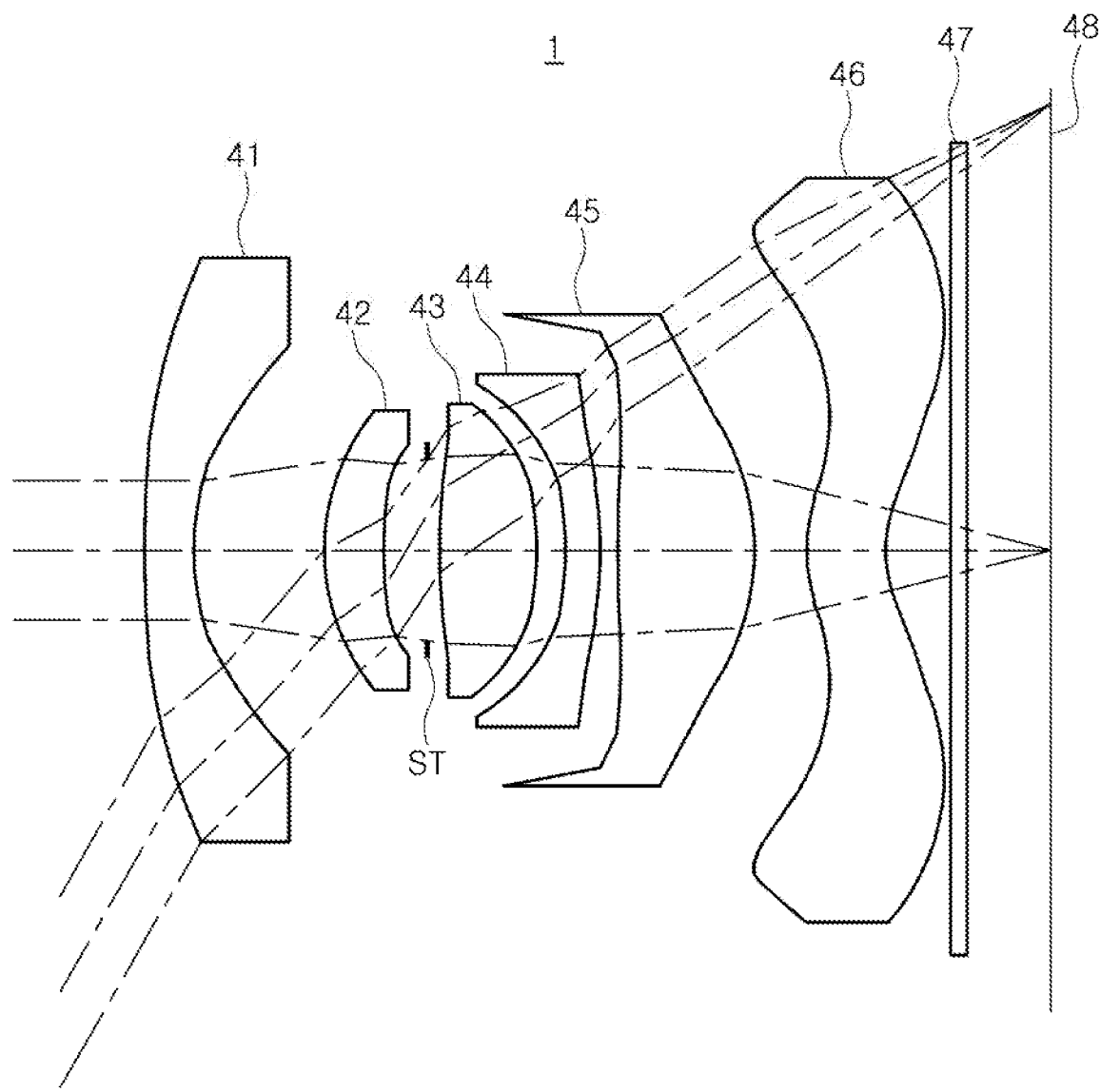
FIG. 8 is a configuration diagram of the first optical imaging system according to a fourth embodiment of the present disclosure.
Figure 9:
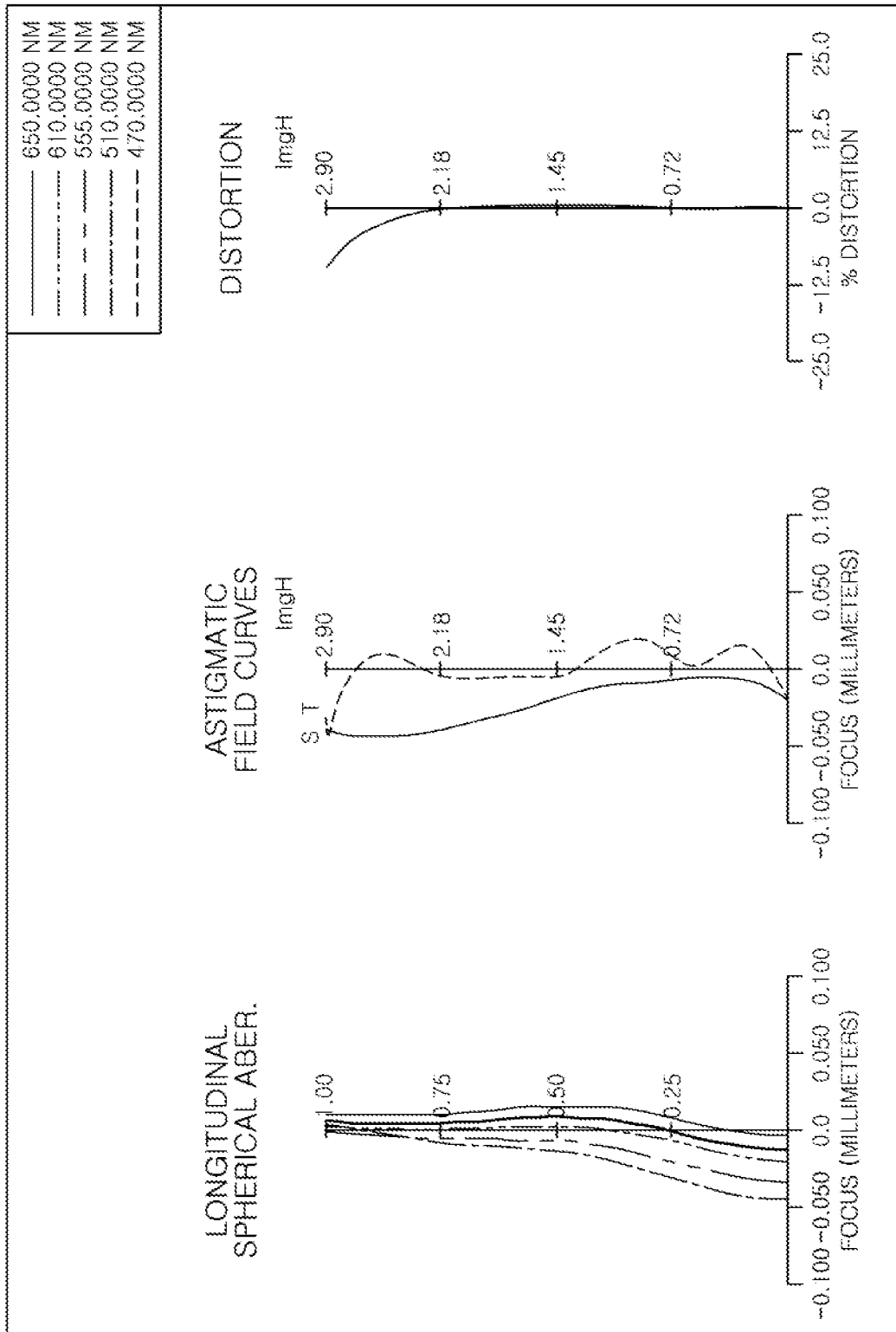
FIG. 9 is a curve representing aberration characteristics of the first optical imaging system illustrated in FIG. 8.

Referring to FIGS. 8 and 9, according to a fourth embodiment of the present disclosure, a first optical imaging system 1 may include an optical imaging system including a first lens 41, a second lens 42, a third lens 43, a fourth lens 44, a fifth lens 45, and a sixth lens 46, and may further include a filter 47 and an image sensor 48.

The first lens 41 to the sixth lens 46 may be disposed to be spaced apart from each other by a predetermined distance along an optical axis, respectively. The first lens 41 to the sixth lens 46 may be formed of a plastic material.

Table 8 illustrates lens characteristics (a radius of curvature, a thickness of a lens or a distance between lenses, a refractive index, and an Abbe number) of each lens.

TABLE 8

| Surface number | Reference | Radius of curvature | Thickness or Distance | Refractive index | Abbe number | Focal length |
|---|---|---|---|---|---|---|
| S1 | First lens | −79.907 | 0.300 | 1.544 | 56.1 | −3.354 |
| S2 | | 1.879 | 0.859 | | | |
| S3 | Second lens | 1.55413 | 0.374 | 1.614 | 25.9 | 5.771 |
| S4 | | 2.495 | 0.287 | | | |
| S5 | Stop | Infinity | 0.070 | | | |
| S6 | Third lens | 4.767 | 0.642 | 1.544 | 56.1 | 2.544 |
| S7 | | −1.870 | 0.173 | | | |
| S8 | Fourth lens | −2.646 | 0.220 | 1.671 | 19.2 | −4.024 |
| S9 | | −85.11910 | 0.128 | | | |
| S10 | Fifth lens | 10.22393 | 0.869 | 1.544 | 56.1 | 3.294 |
| S11 | | −2.120 | 0.338 | | | |
| S12 | Sixth lens | 0.982 | 0.517 | 1.614 | 25.9 | 499.988 |
| S13 | | 0.78646 | 0.422 | | | |
| S14 | Filter | Infinity | 0.110 | 1.517 | 64.2 | |
| S15 | | Infinity | 0.520 | | | |
| S16 | Imaging surface | Infinity | 0.01955 | | | |

Meanwhile, in the first optical imaging system 1, the total focal length F1 may be 1.804 mm, FOV1 may be 121.4°, Fno1 may be 1.97, TTL1 may be 5.85 mm, and, BFL1 may be 1.072 mm.

In a fourth embodiment of the first optical imaging system 1, the first lens 41 may have negative refractive power, and first and second surfaces of the first lens 41 may be concave in a paraxial region.

In addition, at least one inflection point may be formed on the first surface of the first lens 41. For example, the first lens 41 may be concave in the paraxial region and may be convex toward an edge.

The second lens 42 may have positive refractive power, a first surface of the second lens 42 may be convex in a paraxial region, and a second surface of the second lens 42 may be concave in the paraxial region.

The first lens 41 and the second lens 42 may be formed of plastic materials having different optical characteristics from each other. As an example, the Abbe number of the first lens 41 and the second lens 42 may be different from each other.

The third lens 43 may have positive refractive power, and first and second surfaces of the third lens 43 may be convex in a paraxial region.

The second lens 42 and the third lens 43 may be formed of plastic materials having different optical characteristics from each other. As an example, the Abbe number of the second lens 42 and the third lens 43 may be different from each other.

A stop ST may be disposed between the second lens 42 and the third lens 43.

The fourth lens 44 may have negative refractive power, a first surface of the fourth lens 44 may be concave in a paraxial region, and a second surface of the fourth lens 44 may be convex in the paraxial region.

The fifth lens 45 may have positive refractive power, and first and second surfaces of the fifth lens 45 may be convex in a paraxial region.

The sixth lens 46 may have positive refractive power, and a first surface of the sixth lens 46 may be convex in a paraxial region, and a second surface of the sixth lens 46 may be concave in the paraxial region.

In addition, at least one inflection point may be formed on first and second surfaces of the sixth lens 46. For example, the first surface of the sixth lens 46 may be convex in a paraxial region and may be concave toward an edge. The second surface of the sixth lens 46 may be concave in the paraxial region and may be convex toward the edge.

Meanwhile, the fifth lens 45 and the sixth lens 46 may be formed of plastic materials having different optical characteristics from each other. As an example, the Abbe number of the fifth lens 45 and the sixth lens 46 may be different from each other. In addition, the Abbe number of the sixth lens 46 may be 26 or less.

Meanwhile, object side surfaces and image side surfaces of the first lens 41 to the sixth lens 46 may all be aspherical surfaces. For example, each surface of the first lens 41 to the sixth lens 46 may have an aspherical surface coefficient as shown in Table 9.

TABLE 9

| | K | A | B | C | D | E | F | G | H |
|---|---|---|---|---|---|---|---|---|---|
| S1 | 0 | 0.13461 | −0.11275 | 0.07155 | −0.03302 | 0.01064 | −0.00225 | 0.00028 | −0.00002 |
| S2 | −0.12380 | 0.15303 | −0.12086 | 0.04324 | −0.00701 | −0.00075 | 0 | 0 | 0 |
| S3 | 0.36526 | −0.00989 | 0.04598 | −0.16314 | 0.30176 | −0.13581 | 0 | 0 | 0 |
| S4 | 9.74753 | 0.04119 | 0.04536 | −0.18594 | 0.70953 | −0.32574 | 0 | 0 | 0 |
| S6 | 16.55517 | −0.02366 | 0.07207 | −0.22846 | 0.19689 | 0 | 0 | 0 | 0 |
| S7 | 2.41508 | −0.08211 | −0.56627 | 3.77134 | −13.65308 | 28.03459 | −33.64668 | 22.16565 | −6.01660 |
| S8 | 4.88732 | −0.27254 | −0.36865 | 2.15281 | −2.91809 | −3.85609 | 13.73763 | −12.04532 | 3.44030 |
| S9 | 0 | −0.17059 | −0.51107 | 2.45925 | −4.80991 | 5.08864 | −3.01988 | 0.99032 | −0.14835 |
| S10 | −15.57278 | 0.01072 | −0.39935 | 1.00426 | −1.27255 | 0.92269 | −0.39324 | 0.09455 | −0.01042 |
| S11 | 0.31182 | −0.38854 | 0.98521 | −1.60100 | 1.72351 | −1.14397 | 0.45209 | −0.09779 | 0.00890 |
| S12 | −5.15036 | −0.19741 | 0.03887 | 0.01071 | −0.00269 | −0.00402 | 0.00219 | −0.00041 | 0.00003 |
| S13 | −3.18332 | −0.16964 | 0.09686 | −0.04171 | 0.01326 | −0.00306 | 0.00047 | −0.00004 | 0.00000 |

In addition, the optical imaging system thus configured may have aberration characteristics shown in FIG. 9.

Figure 10:
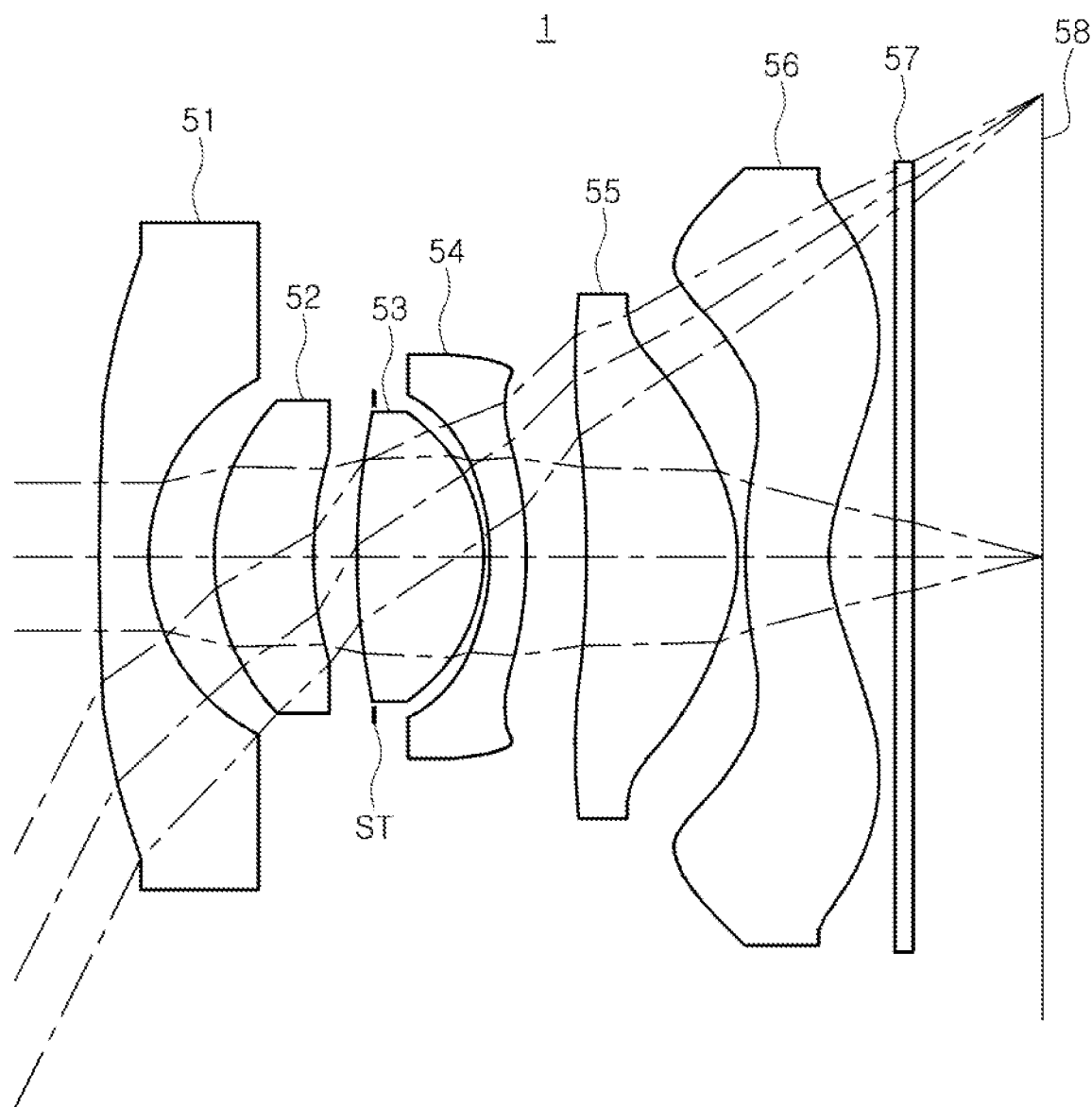
FIG. 10 is a configuration diagram of the first optical imaging system according to a fifth embodiment of the present disclosure.
Figure 11:
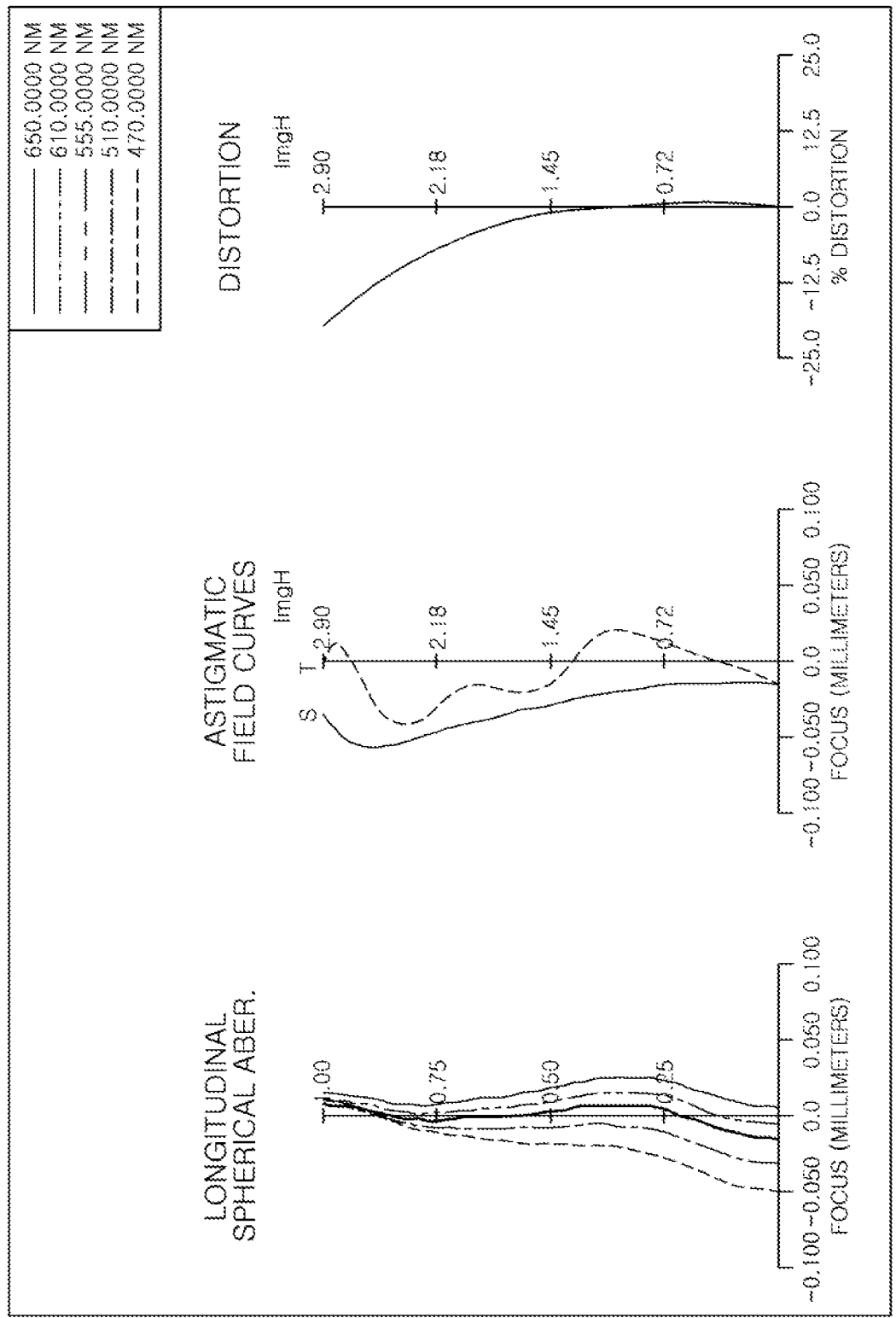
FIG. 11 is a curve representing aberration characteristics of the first optical imaging system illustrated in FIG. 10.

Referring to FIGS. 10 and 11, according to a fifth embodiment of the present disclosure, a first optical imaging system 1 may include an optical system including a first lens 51, a second lens 52, a third lens 53, a fourth lens 54, a fifth lens 55, and a sixth lens 56, sequentially disposed from an object side, and may further include a filter 57 and an image sensor 58.

The first lens 51 to the sixth lens 56 may be disposed to be spaced apart from each other by a predetermined distance along an optical axis, respectively. The first lens 51 to the sixth lens 56 may be formed of a plastic material.

Table 10 illustrates lens characteristics (a radius of curvature, a thickness of a lens or a distance between lenses, a refractive index, an Abbe number, and a focal length) of each lens.

TABLE 10

| Surface number | Reference | Radius of curvature | Thickness or distance | Refractive index | Abbe number | Focal length |
|---|---|---|---|---|---|---|
| S1 | First lens | −27.834 | 0.300 | 1.544 | 56.1 | −2.051 |
| S2 | | 1.172 | 0.400 | | | |
| S3 | Second lens | 1.57057 | 0.628 | 1.614 | 25.9 | 3.649 |
| S4 | | 4.350 | 0.264 | | | |
| S5 | Third lens | 5.06581 | 0.794 | 1.544 | 56.1 | 1.975 |
| S6 | | −1.295 | 0.030 | | | |
| S7 | Fourth lens | −1.736 | 0.230 | 1.671 | 19.2 | −7.907 |
| S8 | | −2.702 | 0.379 | | | |
| S9 | Fifth lens | −3.41613 | 0.950 | 1.544 | 56.1 | 2.375 |
| S10 | | −1.03316 | 0.030 | | | |
| S11 | Sixth lens | 1.893 | 0.521 | 1.614 | 25.9 | −3.608 |
| S12 | | 0.917 | 0.418 | | | |
| S13 | Filter | Infinity | 0.110 | 1.517 | 64.2 | |
| S14 | | Infinity | 0.801 | | | |
| S15 | Imaging surface | Infinity | 0.01955 | | | |

Meanwhile, in the first optical imaging system 1, the total focal length F1 may be 1.804 mm, an angle of view FOV1 may be 126.9°, Fno1 may be 1.97, TTL1 may be 5.875 mm, and BFL1 may be 1.348 mm.

In a fifth embodiment of the first optical imaging system 1, the first lens 51 may have negative refractive power, and first and second surfaces of the first lens 51 may be concave in a paraxial region.

In addition, at least one inflection point may be formed on the first surface of the first lens 51. For example, the first surface of the first lens 51 may be concave in the paraxial region and may be convex toward an edge.

The second lens 52 may have positive refractive power, a first surface of the second lens 52 may be convex in a paraxial region, and a second surface of the second lens 52 may be concave in the paraxial region.

The first lens 51 and the second lens 52 may be formed of plastic materials having different optical characteristics from each other. As an example, the Abbe number of the first lens 51 and the second lens 52 may be different from each other.

The third lens 53 may have positive refractive power, and first and second surfaces of the third lens 53 may be convex in a paraxial region.

The second lens 52 and the third lens 53 may be formed of plastic materials having different optical characteristics from each other. As an example, the Abbe number of the second lens 52 and the third lens 53 may be different from each other.

A stop ST may be disposed between the second lens 52 and the third lens 53.

The fourth lens 54 may have negative refractive power, a first surface of the fourth lens 54 may be concave in a paraxial region, and a second surface of the fourth lens 54 may be convex in the paraxial region.

The fifth lens 55 may have positive refractive power, a first surface of the fifth lens 55 may be concave in a paraxial region, and a second surface of the fifth lens 55 may be convex in the paraxial region.

The sixth lens 56 may have negative refractive power, a first surface of the sixth lens 56 may be convex, in a paraxial region and a second surface of the sixth lens 56 may be concave in the paraxial region.

In addition, at least one inflection point may be formed on the first and second surfaces of the sixth lens 56. For example, the first surface of the sixth lens 56 may be convex in the paraxial region and may be concave toward an edge. The second surface of the sixth lens 56 may be concave in the paraxial region and may be convex toward the edge.

Meanwhile, the fifth lens 55 and the sixth lens 56 may be formed of plastic materials having different optical characteristics from each other. As an example, the Abbe number of the fifth lens 55 and the sixth lens 56 may be different from each other. In addition, the Abbe number of the sixth lens 56 may be 26 or less.

Meanwhile, at least one of object side surfaces and image side surfaces of the first lens 51 to the sixth lens 56 may be an aspherical surface. For example, each surface of the first lens 51 to the sixth lens 56 may have an aspherical surface coefficient as shown in Table 11.

TABLE 11

| | K | A | B | C | D | E | F | G |
|---|---|---|---|---|---|---|---|---|
| S1 | 0 | 0.065483 | −0.03968 | 0.021116 | −0.00729 | 0.001519 | −0.00017 | 8.24E−06 |
| S2 | 0 | −0.09097 | 0.395797 | −1.45063 | 2.964288 | −3.52209 | 2.314678 | −0.64529 |
| S3 | 0 | −0.04163 | 0.200214 | −0.63045 | 1.68779 | −2.44313 | 2.013245 | −0.71923 |
| S4 | 0 | 0.221164 | −0.44254 | 5.02223 | −23.3665 | 66.00539 | −96.5244 | 57.78121 |
| S5 | 50.82239 | −0.02851 | 1.221194 | −12.1101 | 64.87433 | −197.804 | 313.9412 | −205.553 |
| S6 | 0 | 0 | 0 | 0 | 0 | 0 | 0 | 0 |
| S7 | 0 | −0.14895 | −0.64199 | 3.174452 | −4.72626 | −0.08198 | 5.943744 | −3.70163 |
| S8 | 0 | 0.057288 | −0.43514 | 1.089528 | −0.98837 | 0.10879 | 0.448187 | −0.21469 |
| S9 | −13.8144 | 0.197387 | −0.36466 | 0.38509 | −0.23848 | 0.090741 | −0.01938 | 0.001674 |
| S10 | −0.74756 | 0.329506 | −0.48181 | 0.538028 | −0.39467 | 0.181283 | −0.04473 | 0.004471 |
| S11 | 0 | −0.1697 | −0.10039 | 0.104605 | −0.05156 | 0.011925 | −0.00046 | −0.00014 |
| S12 | −4.28179 | −0.07105 | −0.00668 | 0.016414 | −0.0079 | 0.001912 | −0.00024 | 1.2E−05 |

In addition, the optical imaging system thus configured may have aberration characteristics illustrated in FIG. 11.

Figure 12:
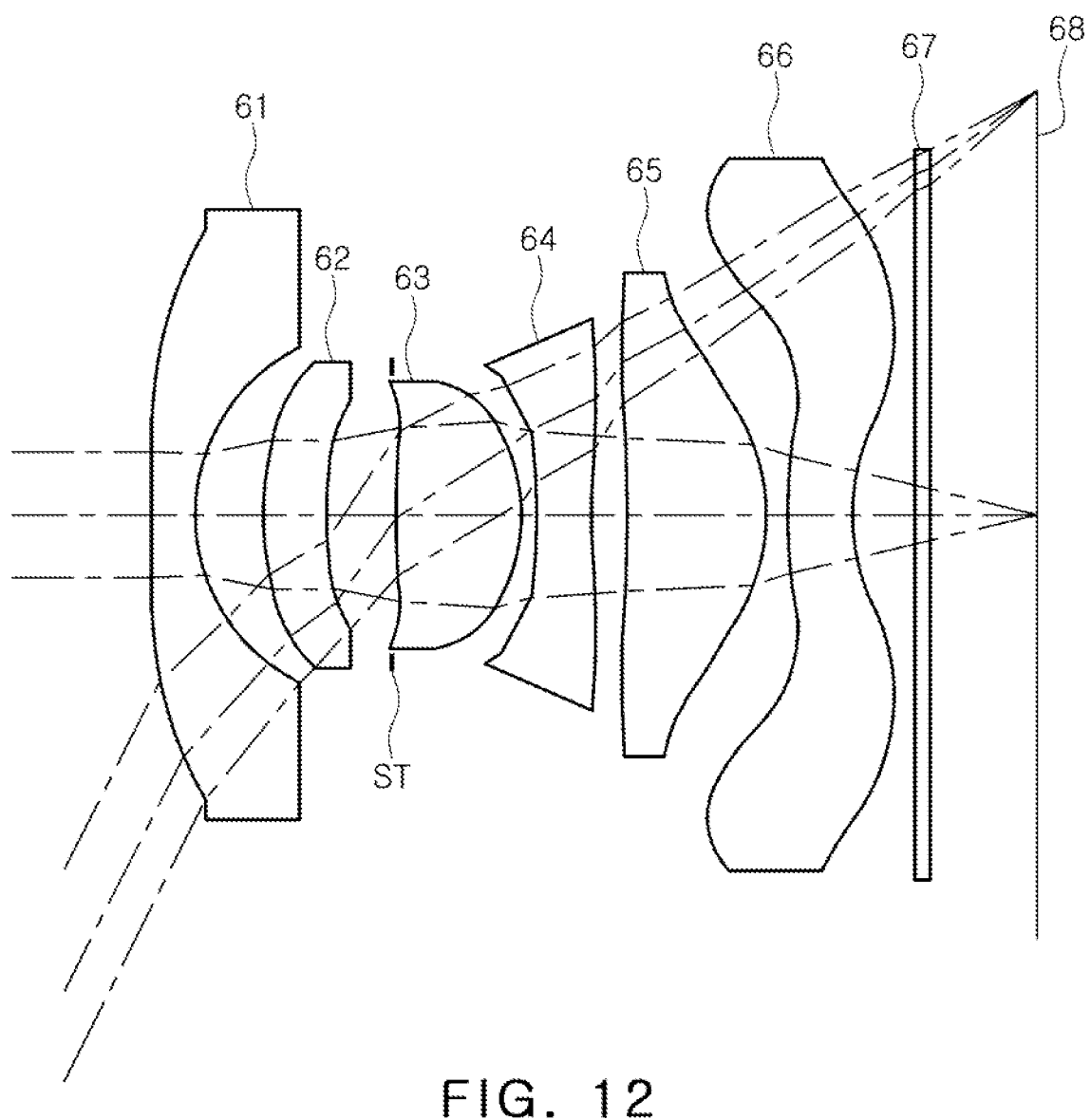
FIG. 12 is a configuration diagram of the first optical imaging system according to a sixth embodiment of the present disclosure.
Figure 13:
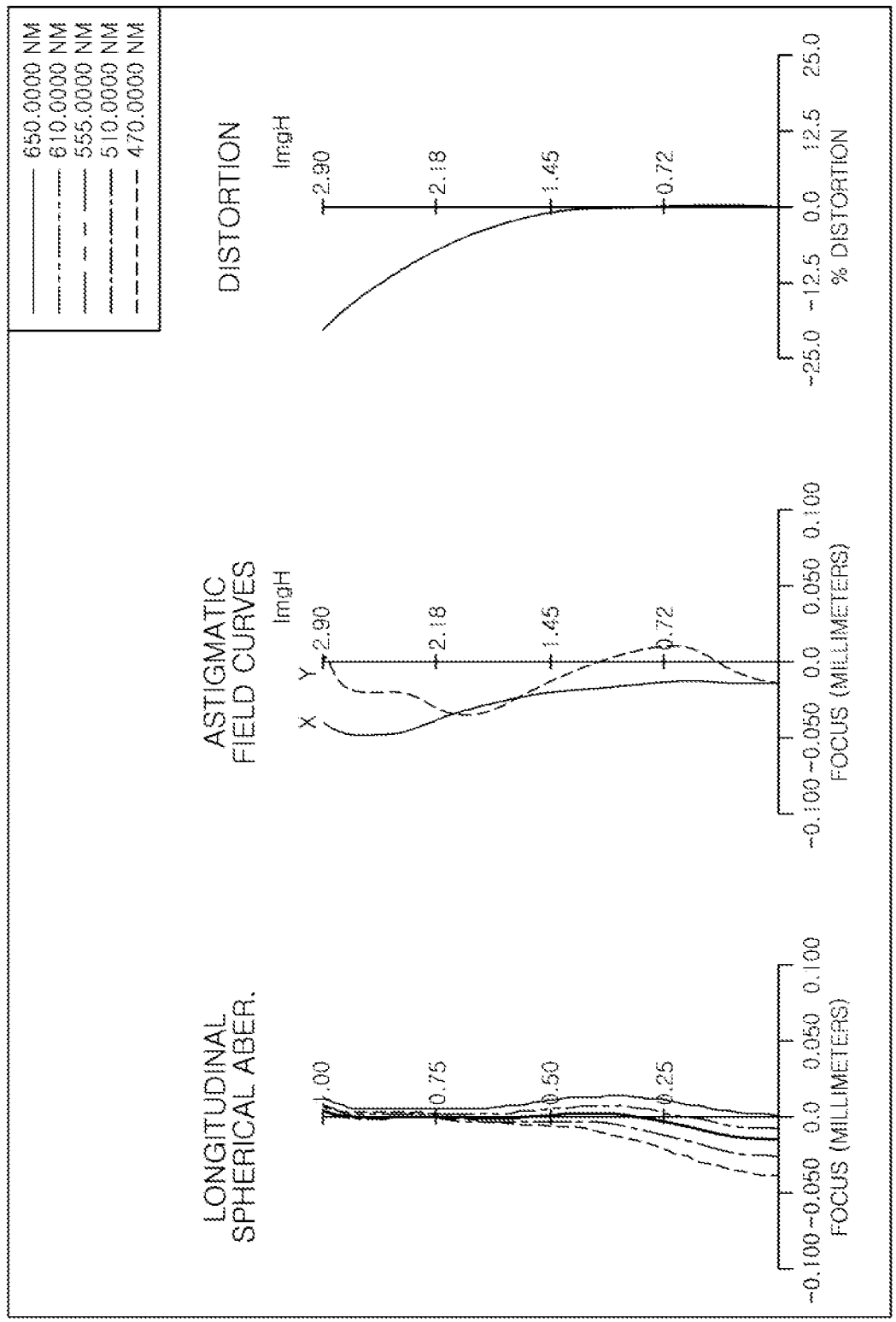
FIG. 13 is a curve representing aberration characteristics of the first optical imaging system illustrated in FIG. 12.

Referring to FIGS. 12 and 13, according to a sixth embodiment of the present disclosure, a first optical imaging system 1 may include an optical system including a first lens 61, a second lens 62, a third lens 63, a fourth lens 64, a fifth lens 65, and a sixth lens 66, sequentially disposed from an object side, and may further include a filter 67 and an image sensor 68.

The first lens 61 to the sixth lens 66 may be disposed to be spaced apart from each other by a predetermined distance along an optical axis, respectively. The first lens 61 to the sixth lens 66 may be formed of a plastic material.

Table 12 illustrates lens characteristics (a radius of curvature, a thickness of a lens or a distance between lenses, a refractive index, an Abbe number, and a focal length) of each lens.

TABLE 12

| Surface number | Reference | Radius of curvature | Thickness or distance | Refractive index | Abbe number | Focal length |
|---|---|---|---|---|---|---|
| S1 | First lens | −76.319 | 0.300 | 1.544 | 56.1 | −2.296 |
| S2 | | 1.277 | 0.457 | | | |
| S3 | Second lens | 2.07116 | 0.438 | 1.639 | 23.5 | 6.199 |
| S4 | | 3.937 | 0.455 | | | |
| S5 | Third lens | 3.69064 | 0.866 | 1.544 | 56.1 | 1.996 |
| S6 | | −1.420 | 0.104 | | | |
| S7 | Fourth lens | 17.552 | 0.364 | 1.661 | 20.35 | −5.530 |
| S8 | | 3.029 | 0.242 | | | |
| S9 | Fifth lens | −9.14891 | 0.950 | 1.544 | 56.1 | 2.168 |
| S10 | | −1.08759 | 0.151 | | | |
| S11 | Sixth lens | 1.941 | 0.432 | 1.614 | 25.9 | −3.430 |
| S12 | | 0.928 | 0.418 | | | |
| S13 | Filter | Infinity | 0.110 | 1.517 | 64.2 | |
| S14 | | Infinity | 0.716 | | | |
| S15 | Imaging surface | Infinity | 0.01446 | | | |

Meanwhile, in the first optical imaging system 1, the total focal length F1 may be 1.8 mm, an angle of view (FOV1) may be 127.1°, Fno1 may be 2.17, TTL1 may be 6.018 mm, and BFL1 may be 1.259 mm.

In a sixth embodiment of the first optical imaging system 1, the first lens 61 may have negative refractive power, and first and second surfaces of the first lens 61 may be concave in a paraxial region.

In addition, at least one inflection point may be formed on the first surface of the first lens 61. For example, the first surface of the first lens 61 may be concave in a paraxial region and may be convex toward an edge.

The second lens 62 may have positive refractive power, a first surface of the second lens 62 may be convex in a paraxial region, and a second surface of the second lens 62 may be concave in the paraxial region.

The first lens 61 and the second lens 62 may be formed of plastic materials having different optical characteristics from each other. As an example, the Abbe number of the first lens 61 and the second lens 62 may be different from each other.

The third lens 63 may have positive refractive power, first and second surfaces of the third lens 63 may be convex in the paraxial region.

The second lens 62 and the third lens 63 may be formed of plastic materials having different optical characteristics from each other. As an example, the Abbe number of the second lens 62 and the third lens 63 may be different from each other.

A stop ST may be disposed between the second lens 62 and the third lens 63.

The fourth lens 64 may have negative refractive power, a first surface of the fourth lens 64 may be convex in a paraxial region, and a second surface of the fourth lens 64 may be concave in the paraxial region.

The fifth lens 65 may have positive refractive power, a first surface of the fifth lens 65 may be concave in a paraxial region, and a second surface of the fifth lens 65 may be convex in the paraxial region.

The sixth lens 66 may have negative refractive power, a first surface of the sixth lens 66 may be convex, and a second surface of the sixth lens 66 may be concave in the paraxial region.

In addition, at least one inflection point may be formed on the first and second surfaces of the sixth lens 66. For example, the first surface of the sixth lens 66 may be convex in the paraxial region and may be concave toward an edge. The second surface of the sixth lens 66 may be concave in the paraxial region and may be convex toward the edge.

Meanwhile, the fifth lens 65 and the sixth lens 66 may be formed of plastic materials having different optical characteristics from each other. As an example, the Abbe number of the fifth lens 65 and the sixth lens 66 may be different from each other. In addition, the Abbe number of the sixth lens 66 may be 26 or less.

Meanwhile, object side surfaces and image side surfaces of the first lens 61 to the sixth lens 66 may all be aspherical surfaces. For example, each surface of the first lens 61 to the sixth lens 66 may have an aspherical surface coefficient as shown in Table 13.

TABLE 13

|  | K | A | B | C | D | E | F | G |
|---|---|---|---|---|---|---|---|---|
| S1 | 0 | 0.068509 | −0.03163 | 0.013978 | −0.00417 | 0.000691 | −4.7E−05 | 0 |
| S2 | 0 | −0.03209 | −0.01392 | 0.174166 | −0.3508 | 0.365799 | −0.13659 | 0 |
| S3 | 0 | −0.06331 | 0.139087 | −0.03644 | 0.104628 | −0.07923 | 0 | 0 |
| S4 | 0 | 0.112458 | 0.02736 | 0.780831 | −1.34047 | 0.936652 | 0 | 0 |
| S5 | 5.827832 | −0.04723 | 0.411412 | −2.81044 | 6.648248 | −5.55443 | −3.43272 | 0 |
| S6 | 1.481986 | −0.38011 | 1.542717 | −3.5706 | 5.197627 | −4.52795 | 1.785504 | 0 |
| S7 | 0 | −0.7141 | 1.581408 | −2.88402 | 3.42128 | −2.62129 | 0.84099 | 0 |
| S8 | −11.3523 | −0.26206 | 0.299755 | −0.18079 | 0.046521 | 0.001724 | −0.0024 | 0 |
| S9 | −89.0846 | 0.129618 | −0.28423 | 0.296445 | −0.16288 | 0.049159 | −0.00664 | 0 |
| S10 | −0.71623 | 0.241603 | −0.26091 | 0.23643 | −0.13975 | 0.049332 | −0.00707 | 0 |
| S11 | 0 | −0.257 | 0.031918 | −0.02082 | 0.02795 | −0.01658 | 0.004655 | −0.0005 |
| S12 | −4.07704 | −0.11987 | 0.034196 | −0.00521 | −0.00045 | 0.000345 | −5.6E−05 | 3.28E−06 |

In addition, the optical imaging system thus configured may have aberration characteristics illustrated in FIG. 13.

Hereinafter, a second optical imaging system 2 will be described with reference to FIGS. 14 to 20.

The second optical imaging system 2 may satisfy at least one of the following conditional expressions.

$Fno2<1.7$  [Conditional Expression 17]

$TTL2/ImgH2<2.0$  [Conditional Expression 18]

$70°≤FOV2$  [Conditional Expression 19]

$-1.0<(R11\_2+R12\_2)/(R11\_2-R12\_2)<1.0$  [Conditional Expression 20]

$-1.0<(R9\_2-R10\_2)/(R9\_2+R102)<1.0$  [Conditional Expression 21]

$35<v1\_2-v2\_2$  [Conditional Expression 22]

$-31<v3\_2-v4\_2$  [Conditional Expression 23]

$1.5<Th1\_2/Sag1\_2$  [Conditional Expression 24]

$55<v7\_2$  [Conditional Expression 25]

$1.66<Nd2\_2$  [Conditional Expression 26]

$1.65≤Nd5\_2$  [Conditional Expression 27]

$1.61<Nd6\_2$  [Conditional Expression 28]

$1.60<(Nd2\_2+Nd5\_2+Nd6\_2)/3<1.66$  [Conditional Expression 29]

$1.59<(Nd2\_2+Nd3\_2+Nd4\_2+Nd5\_2+Nd6\_2)/5<1.61$  [Conditional Expression 30]

$50<|f5\_2/F2|$  [Conditional Expression 31]

$50<|f6\_2/F2|$  [Conditional Expression 32]

Fno2 may be a number (f-number) representing brightness of the second optical imaging system 2, TTL2 may be a distance from an object side surface of a first lens of the second optical imaging system 2 to an imaging surface of an image sensor, F2 may be a total focal length of the second optical imaging system 2, ImgH2 may be ½ of a diagonal length of the imaging surface of the image sensor of the second optical imaging system 2, FOV2 may be an angle of view of the second optical imaging system 2, R9_2 may be a radius of curvature of an object side surface of the fifth lens of the second optical imaging system 2, R10_2 may be a radius of curvature of an image side surface of the fifth lens of the second optical imaging system 2, R11_2 may be a radius of curvature of an object side surface of the sixth lens of the second optical imaging system 2, R12_2 may be a radius of an image side surface of the sixth lens of the second optical imaging system 2, v1_2 may be an Abbe number of the first lens of the second optical imaging system 2, v2_2 may be an Abbe number of the second lens of the second optical imaging system 2, v3_2 may be an Abbe number of the third lens of the second optical imaging system 2, v4_2 may be an Abbe number of the fourth lens of the second optical imaging system 2, v7_2 may be an Abbe number of the seventh lens of the second optical imaging system 2, Th1_2 may be a center thickness of the first lens of the second optical imaging system 2, Sag1_2 may be a distance in the optical axis direction from the end of an effective surface of the object side surface of the first lens of the second optical imaging system 2 to an apex of the effective surface of the object side surface of the first lens, Nd2_2 may be a refractive index of the second lens of the second optical imaging system 2, Nd5_2 may be a refractive index of the fifth lens of the second optical imaging system 2, Nd6_2 may be a refractive index of the sixth lens of the second optical imaging system 2, f5_2 may be a focal length of the fifth lens of the second optical imaging system 2, and f6_2 may be a focal length of the sixth lens of the second optical imaging system 2.

Meanwhile, the effective surface may mean a portion in which light actually impinges on each surface of the lens.

Figure 14:
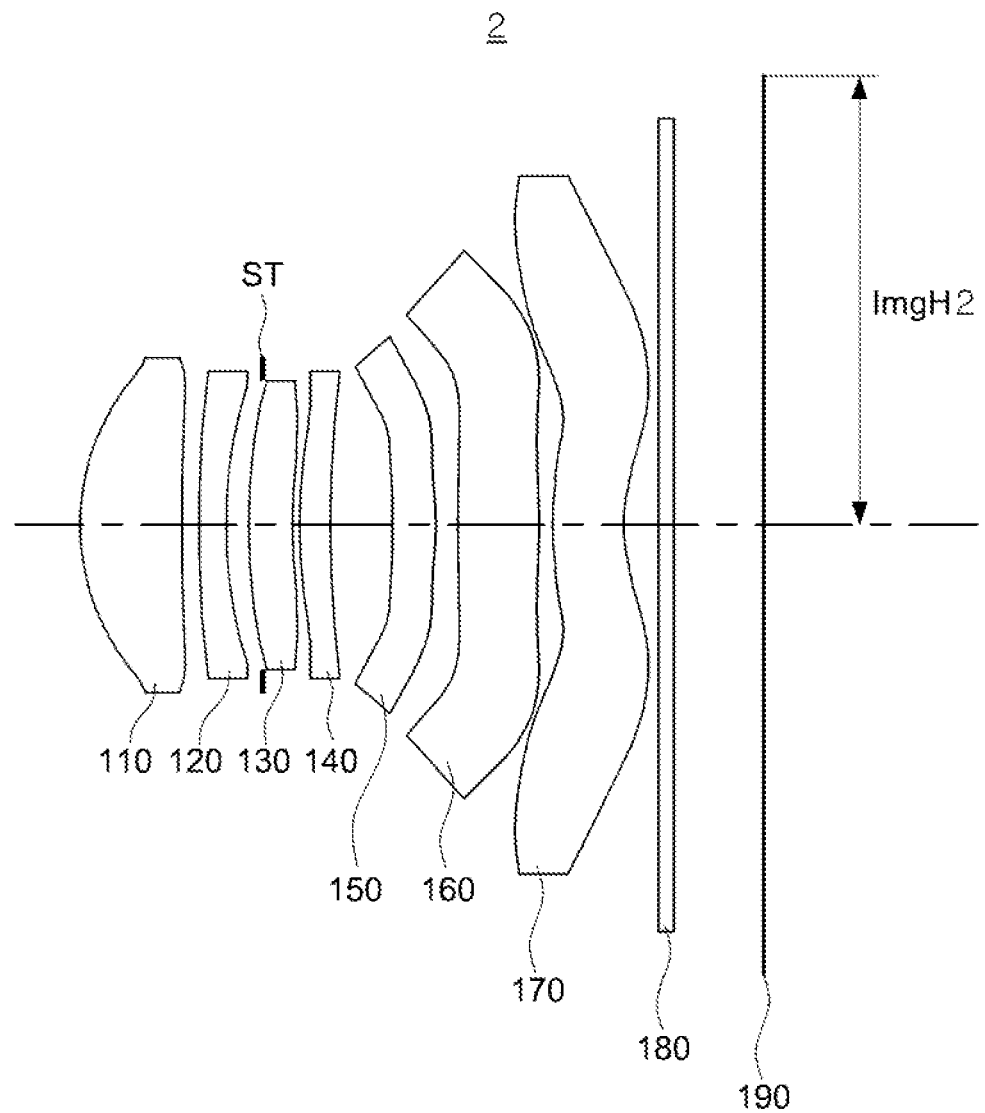
FIG. 14 is a configuration diagram of a second optical imaging system according to a first embodiment of the present disclosure.
Figure 15:
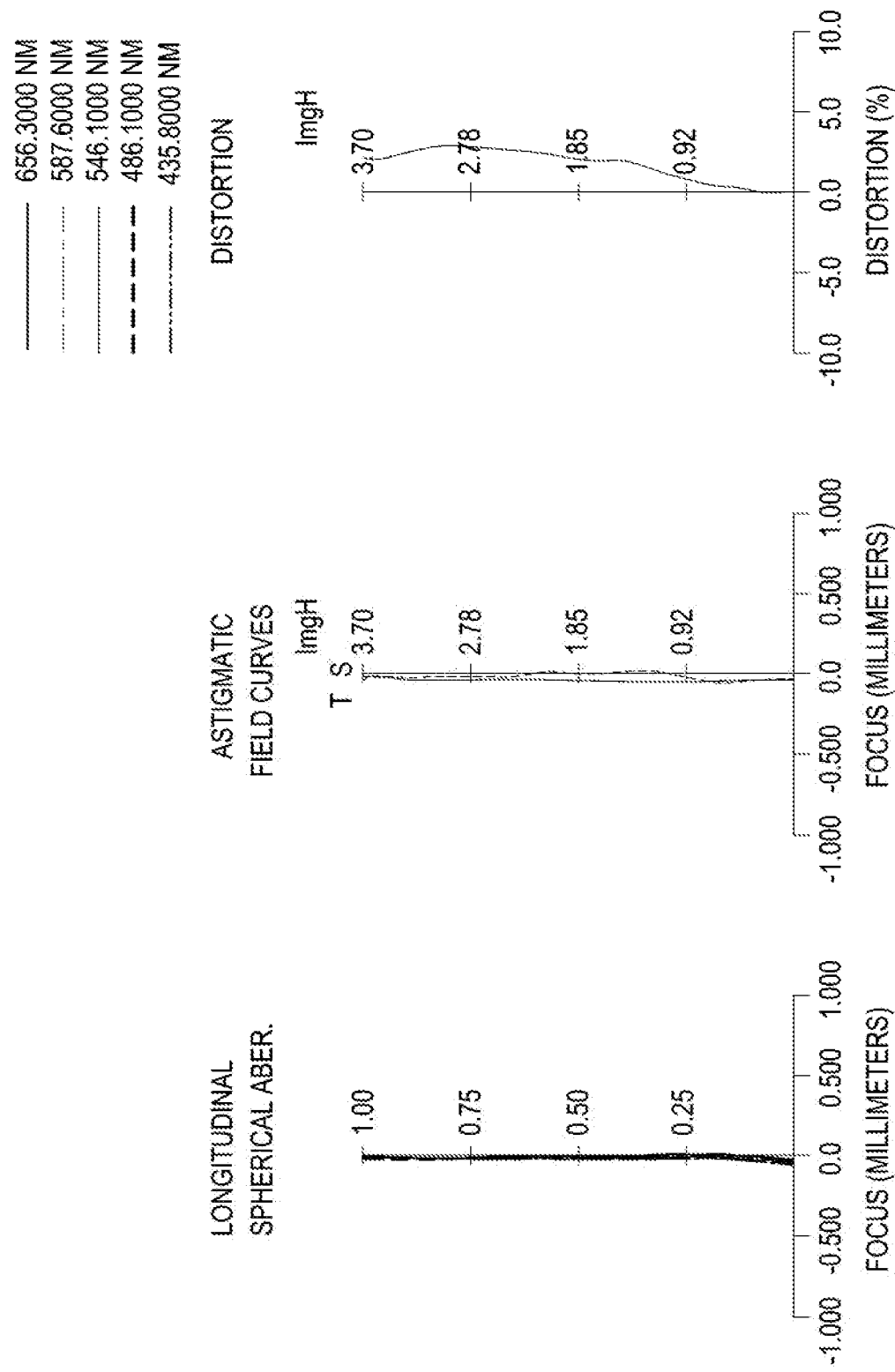
FIG. 15 is a curve representing aberration characteristics of the second optical imaging system illustrated in FIG. 14.

Referring to FIGS. 14 and 15, according to a first embodiment of the present disclosure, the second optical imaging system 2 may include an optical system including a first lens 110, a second lens 120, a third lens 130, a fourth lens 140, a fifth lens 150, a sixth lens 160 and a seventh lens 170 sequentially disposed from an object side, and may further include an infrared block filter 180 (hereinafter referred to as a 'filter') and an image sensor 190.

The first lens 110 to the seventh lens 170 may be disposed to be spaced apart from each other by a predetermined distance along an optical axis, respectively. The first lens 110 to the seventh lens 170 may be formed of a plastic material.

Table 14 illustrates lens characteristics (a radius of curvature, a thickness of a lens or a distance between lenses, a refractive index, an Abbe number, and a focal length) of each lens.

TABLE 14

| Surface number | Reference | Radius of curvature | Thickness or distance | Refractive index | Abbe number | Focal length |
|---|---|---|---|---|---|---|
| S1 | First lens | 1.8301 | 0.7720 | 1.544 | 56.1 | 4.470 |
| S2 | | 6.2991 | 0.1447 | | | |
| S3 | Second lens | 8.2729 | 0.2000 | 1.661 | 20.4 | −9.660 |
| S4 | | 3.5691 | 0.1696 | | | |
| S5 | Third lens | 3.7311 | 0.3337 | 1.544 | 56.1 | 173.727 |
| S6 | | 3.7620 | 0.0470 | | | |
| S7 | Fourth lens | 2.6622 | 0.2300 | 1.544 | 56.1 | 9.811 |
| S8 | | 5.1500 | 0.4686 | | | |
| S9 | Fifth lens | −1000.000 | 0.3109 | 1.661 | 20.4 | 12226873.6 |
| S10 | | −1000.000 | 0.1970 | | | |
| S11 | Sixth lens | 1000.000 | 0.5668 | 1.639 | 23.5 | 782.559 |
| S12 | | −1000.000 | 0.1428 | | | |
| S13 | Seventh lens | 1.6880 | 0.5353 | 1.534 | 55.7 | −11.283 |
| S14 | | 1.1730 | 0.2666 | | | |
| S15 | Filter | Infinity | 0.1100 | 1.518 | 64.2 | |
| S16 | | Infinity | 0.6800 | | | |
| S17 | Imaging surface | Infinity | 0.0100 | | | |

Meanwhile, in the second optical imaging system 2, the total focal length F2 may be 4.3 mm, the angle of view FOV2 may be 76.72°, Fno2 may be 1.57, TTL2 may be 5.185 mm, and BFL2 may be 1.067 mm.

Here, BFL2 may be a distance from an image side surface of the seventh lens 170 to an imaging surface of the image sensor 190.

In a first embodiment of the second optical imaging system 2, the first lens 110 may have positive refractive power, a first surface of the first lens 110 may be convex in a paraxial region, and a second surface of the first lens 110 may be concave in the paraxial region.

The second lens 120 may have negative refractive power, a first surface of the second lens 120 may be convex in a paraxial region, and a second surface of the second lens 120 may be concave in the paraxial region.

The first lens 110 and the second lens 120 may be formed of plastic materials having different optical characteristics from each other. As an example, the Abbe number of the first lens 110 and the second lens 120 may be different from each other.

The third lens 130 may have positive refractive power, a first surface of the third lens 130 may be convex in a paraxial region, and a second surface of the third lens 130 may be concave in the paraxial region.

The second lens 120 and the third lens 130 may be formed of plastic materials having different optical characteristics from each other. As an example, the Abbe number of the second lens 120 and the third lens 130 may be different from each other.

A stop ST may be disposed between the second lens 120 and the third lens 130.

The fourth lens 140 may have positive refractive power, a first surface of the fourth lens 140 may be convex in a paraxial region, and a second surface of the fourth lens 140 may be concave in the paraxial region.

The fifth lens 150 may have positive refractive power, a first surface of the fifth lens 150 may be concave in a paraxial region, and a second surface of the fifth lens 150 may be convex in the paraxial region.

The sixth lens 160 may have positive refractive power, first and second surfaces of the sixth lens 160 may be convex in a paraxial region.

In addition, at least one inflection point may be formed on the first and second surfaces of the sixth lens 160. For example, the first surface of the sixth lens 160 may be convex in the paraxial region and may be concave toward an edge. The second surface of the sixth lens 160 may be convex in the paraxial region and may be concave toward the edge.

The seventh lens 170 may have negative refractive power, a first surface of the seventh lens 170 may be convex in a paraxial region, and a second surface of the seventh lens 170 may be concave in the paraxial region.

In addition, at least one inflection point may be formed on the first and second surfaces of the seventh lens 170. For example, the first surface of the seventh lens 170 may be convex in the paraxial region and may be concave toward an edge. The second surface of the seventh lens 170 may be concave in the paraxial region and may be convex toward the edge.

The second optical imaging system 2 may include a plurality of lenses having a high refractive index. For example, the second lens 120, the fifth lens 150, and the sixth lens 160 may have a refractive power of 1.6 or more. For example, the refractive index of the second lens 120 and the fifth lens 150 may be equal to or greater than 1.65 and less than 1.75, and the refractive index of the sixth lens 160 may be greater than 1.61.

The fifth lens 150 and the sixth lens 160 of the second optical imaging system 2 may have a considerably elongated focal length. For example, an absolute value of a focal length f5_2 of the fifth lens 150 and an absolute value of a focal length f6_2 of the sixth lens 160 may be 200 or more.

Meanwhile, object side surfaces and image side surfaces of the first lens 110 to the seventh lens 170 may all be aspherical surfaces. For example, each surface of the first lens 110 to the seventh lens 170 may have an aspherical surface coefficient as shown in Table 15.

TABLE 15

|  | K | A | B | C | D | E | F | G | H | J |
|---|---|---|---|---|---|---|---|---|---|---|
| S1 | −1.655 | 0.012 | 0.097 | −0.316 | 0.610 | −0.741 | 0.564 | −0.262 | 0.068 | −0.007 |
| S2 | −24.000 | −0.013 | −0.036 | 0.041 | −0.043 | 0.043 | −0.036 | 0.021 | −0.007 | 0.001 |
| S3 | −50.687 | −0.039 | −0.031 | 0.000 | 0.220 | −0.442 | 0.448 | −0.255 | 0.079 | −0.010 |
| S4 | 4.824 | −0.043 | −0.063 | 0.151 | −0.383 | 0.818 | −1.051 | 0.767 | −0.288 | 0.042 |
| S5 | −12.799 | −0.008 | 0.162 | −0.939 | 2.417 | −3.962 | 4.125 | −2.590 | 0.900 | −0.134 |
| S6 | −42.892 | −0.108 | 0.317 | −0.851 | 1.291 | −1.549 | 1.597 | −1.138 | 0.454 | −0.075 |
| S7 | −0.353 | −0.237 | 0.581 | −1.663 | 3.444 | −5.297 | 5.688 | −3.834 | 1.427 | −0.223 |
| S8 | −4.250 | −0.025 | −0.042 | 0.311 | −1.013 | 1.759 | −1.809 | 1.126 | −0.397 | 0.061 |
| S9 | 0.000 | 0.083 | −0.811 | 2.302 | −4.184 | 5.047 | −4.049 | 2.072 | −0.610 | 0.078 |
| S10 | 0.000 | 0.263 | −1.139 | 2.072 | −2.444 | 1.918 | −0.991 | 0.323 | −0.060 | 0.005 |
| S11 | 0.000 | 0.463 | −1.112 | 1.591 | −1.606 | 1.086 | −0.477 | 0.130 | −0.020 | 0.001 |
| S12 | 0.000 | 0.146 | −0.170 | 0.112 | −0.063 | 0.029 | −0.009 | 0.002 | 0.000 | 0.000 |
| S13 | −10.824 | −0.201 | 0.053 | 0.010 | −0.009 | 0.002 | 0.000 | 0.000 | 0.000 | 0.000 |
| S14 | −5.597 | −0.136 | 0.063 | −0.025 | 0.008 | −0.001 | 0.000 | 0.000 | 0.000 | 0.000 |

In addition, the optical imaging system thus configured may have aberration characteristics illustrated in FIG. 15.

Figure 16:
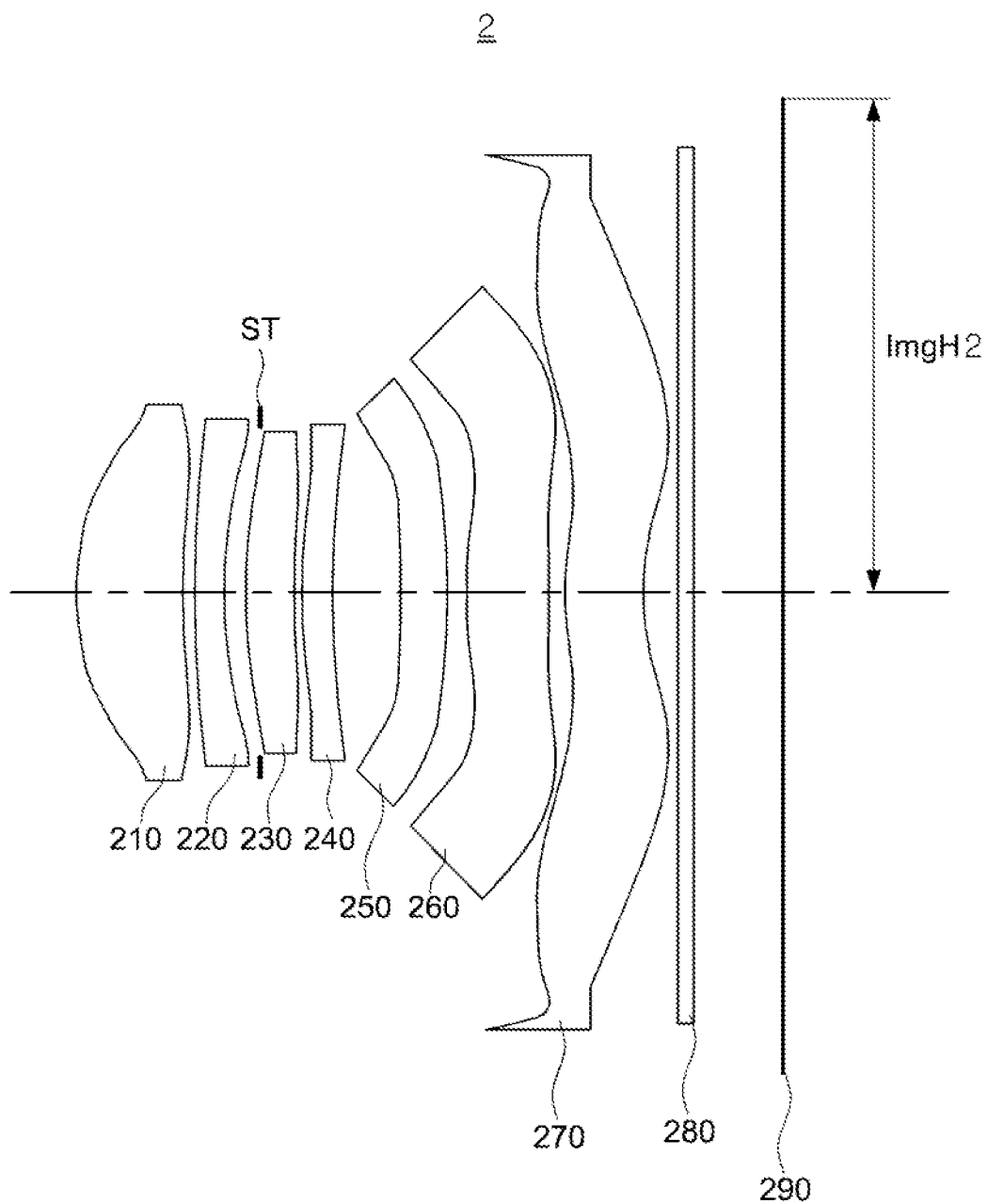
FIG. 16 is a configuration diagram of the second optical imaging system according to a second embodiment of the present disclosure.
Figure 17:
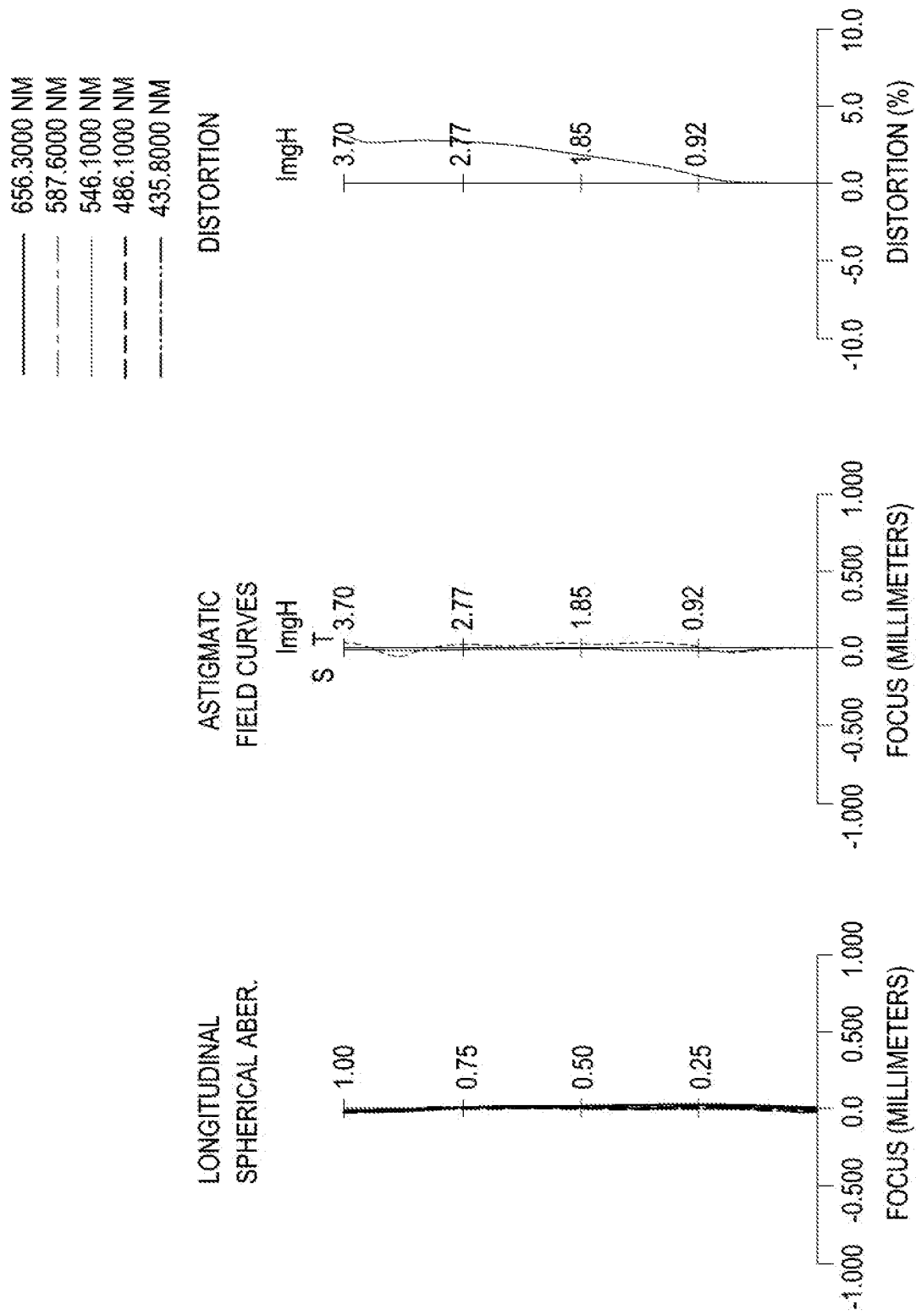
FIG. 17 is a curve representing aberration characteristics of the second optical imaging system illustrated in FIG. 16.

Referring to FIGS. 16 and 17, according to a second embodiment of the present disclosure, a second optical imaging system 2 may include an optical system including a first lens 210, a second lens 220, a third lens 230, a fourth lens 240, a fifth lens 250, a sixth lens 260 and a seventh lens 270, and may further include an infrared block filter 280 (hereinafter referred to as a 'filter') and an image sensor 290.

The first lens 210 to the seventh lens 270 may be disposed to be spaced apart from each other by a predetermined distance along an optical axis, respectively. The first lens 210 to the seventh lens 270 may be formed of a plastic material.

Table 16 illustrates lens characteristics (a radius of curvature, a thickness of a lens or a distance between lenses, a refractive index, an Abbe number, and a focal length) of each lens.

The second lens 220 may have negative refractive power, the first surface of the second lens 220 may be convex in a paraxial region, and the second surface of the second lens 220 may be concave in the paraxial region.

The first lens 210 and the second lens 220 may be formed of plastic materials having different optical characteristics from each other. As an example, the Abbe number of the first lens 210 and the second lens 220 may be different from each other.

The third lens 230 may have positive refractive power, a first surface of the third lens 230 may be convex in a paraxial region, and a second surface of the third lens 230 may be concave in the paraxial region.

The second lens 220 and the third lens 230 may be formed of plastic materials having different optical characteristics from each other. As an example, the Abbe number of second lens 220 and the third lens 230 may be different from each other.

TABLE 17

| Surface number | Reference | Radius of curvature | Thickness or distance | Refractive index | Abbe number | Focal length |
|---|---|---|---|---|---|---|
| S1 | First lens | 1.8308 | 0.7752 | 1.544 | 56.1 | 4.475 |
| S2 | | 6.2824 | 0.0847 | | | |
| S3 | Second lens | 6.8610 | 0.2000 | 1.661 | 20.4 | −9.598 |
| S4 | | 3.2580 | 0.1828 | | | |
| S5 | Third lens | 3.2915 | 0.3477 | 1.544 | 56.1 | 55.807 |
| S6 | | 3.5544 | 0.0538 | | | |
| S7 | Fourth lens | 2.8234 | 0.2300 | 1.544 | 56.1 | 11.039 |
| S8 | | 5.1757 | 0.4972 | | | |
| S9 | Fifth lens | −1000.000 | 0.3274 | 1.650 | 21.5 | 11926835.3 |
| S10 | | −1000.000 | 0.1660 | | | |
| S11 | Sixth lens | 1000.000 | 0.5800 | 1.614 | 26.0 | 814.422 |
| S12 | | −1000.000 | 0.1257 | | | |
| S13 | Seventh lens | 1.8210 | 0.5750 | 1.537 | 55.7 | |
| S14 | | 1.2228 | 0.2594 | | | |
| S15 | Filter | Infinity | 0.1100 | 1.518 | 64.2 | |
| S16 | | Infinity | 0.6413 | | | |
| S17 | Imaging surface | Infinity | 0.0100 | | | |

Meanwhile, in the second optical imaging system 2, the total focal length F2 may be 4.31 mm, the angle of view FOV2 may be 76.5°, Fno2 may be 1.57, TTL2 may be 5.166 mm, and BFL2 may be 1.021 mm.

In a second embodiment of the second optical imaging system 2, a first surface of the first lens 210 may be convex in a paraxial region, and a second surface of the first lens 210 may be concave in the paraxial region.

A stop ST may be disposed between the second lens 220 and the third lens 230.

The fourth lens 240 may have positive refractive power, a first surface of the fourth lens 240 may be convex in a paraxial region, and a second surface of the fourth lens 240 may be concave in the paraxial region.

The fifth lens 250 may have positive refractive power, a first surface of the fifth lens 250 may be concave in a paraxial region, and a second surface of the fifth lens 250 may be convex in the paraxial region.

The sixth lens 260 may have positive refractive power, and first and second surfaces of the sixth lens 260 may be convex in the paraxial region.

In addition, at least one inflection point may be formed on the first and second surfaces of the sixth lens 260. For example, the first surface of the sixth lens 260 may be convex in the paraxial region and may be concave toward an edge. The second surface of the sixth lens 260 may be convex in the paraxial region and may be concave toward the edge.

The seventh lens 270 may have negative refractive power, a first surface of the seventh lens 270 may be convex in a paraxial region, and a second surface of the seventh lens 270 may be concave in the paraxial region.

In addition, at least one inflection point may be formed on the first and second surfaces of the seventh lens 270. For example, the first surface of the seventh lens 270 may be convex in the paraxial region and may be concave toward an edge. The second surface of the seventh lens 270 may be concave in the paraxial region and may be convex toward the edge.

The second optical imaging system 2 may have a plurality of lenses having a high refractive index. For example, the second lens 220, the fifth lens 250 and the sixth lens 260 may have a refractive index of 1.6 or more. For example, the refractive indexes of the second lens 220 and the fifth lens 250 may be equal to or greater than 1.65 and less than 1.75, and the refractive index of the sixth lens 260 may be greater than 1.61.

In the second optical imaging system 2, the fifth lens 250 and the sixth lens 260 may have a considerably elongated focal length. For example, an absolute value of a focal length f5_2 of the fifth lens 250 and an absolute value of a focal length f6_2 of the sixth lens 260 may be 200 or more.

Meanwhile, object side surfaces and image side surfaces of the first lens 210 to the seventh lens 270 may all be aspherical surfaces. For example, each surface of the first lens 210 to the seventh lens 270 may have an aspherical surface coefficient as shown in Table 17.

TABLE 17

|  | K | A | B | C | D | E | F | G | H | J |
|---|---|---|---|---|---|---|---|---|---|---|
| S1 | −1.656 | 0.017 | 0.061 | −0.191 | 0.345 | −0.391 | 0.276 | −0.118 | 0.028 | −0.003 |
| S2 | −29.549 | 0.024 | −0.175 | 0.227 | −0.140 | 0.013 | 0.039 | −0.028 | 0.008 | −0.001 |
| S3 | −31.058 | 0.029 | −0.235 | 0.236 | 0.178 | −0.620 | 0.643 | −0.346 | 0.097 | −0.011 |
| S4 | 4.285 | 0.005 | −0.164 | 0.036 | 0.643 | −1.605 | 2.015 | −1.469 | 0.592 | −0.102 |
| S5 | −11.842 | 0.013 | 0.094 | −0.791 | 2.300 | −4.209 | 4.814 | −3.282 | 1.228 | −0.195 |
| S6 | −43.654 | −0.082 | 0.324 | −1.289 | 3.146 | −5.876 | 7.418 | −5.593 | 2.264 | −0.380 |
| S7 | −0.420 | −0.223 | 0.589 | −1.974 | 5.123 | −9.881 | 12.421 | −9.265 | 3.709 | −0.615 |
| S8 | −2.376 | −0.029 | −0.064 | 0.429 | −1.093 | 1.409 | −1.004 | 0.404 | −0.091 | 0.011 |
| S9 | 0.000 | 0.107 | −1.122 | 3.496 | −6.753 | 8.525 | −7.072 | 3.709 | −1.114 | 0.146 |
| S10 | 0.000 | 0.397 | −1.761 | 3.408 | −4.196 | 3.399 | −1.796 | 0.594 | −0.111 | 0.009 |
| S11 | 0.000 | 0.623 | −1.600 | 2.343 | −2.377 | 1.623 | −0.724 | 0.201 | −0.031 | 0.002 |
| S12 | 0.000 | 0.220 | −0.272 | 0.168 | −0.072 | 0.023 | −0.005 | 0.001 | 0.000 | 0.000 |
| S13 | −10.608 | −0.198 | 0.077 | −0.012 | 0.000 | 0.000 | 0.000 | 0.000 | 0.000 | 0.000 |
| S14 | −6.924 | −0.102 | 0.029 | −0.005 | 0.000 | 0.000 | 0.000 | 0.000 | 0.000 | 0.000 |

In addition, the optical imaging system thus configured may have aberration characteristics illustrated in FIG. 17.

Figure 18:
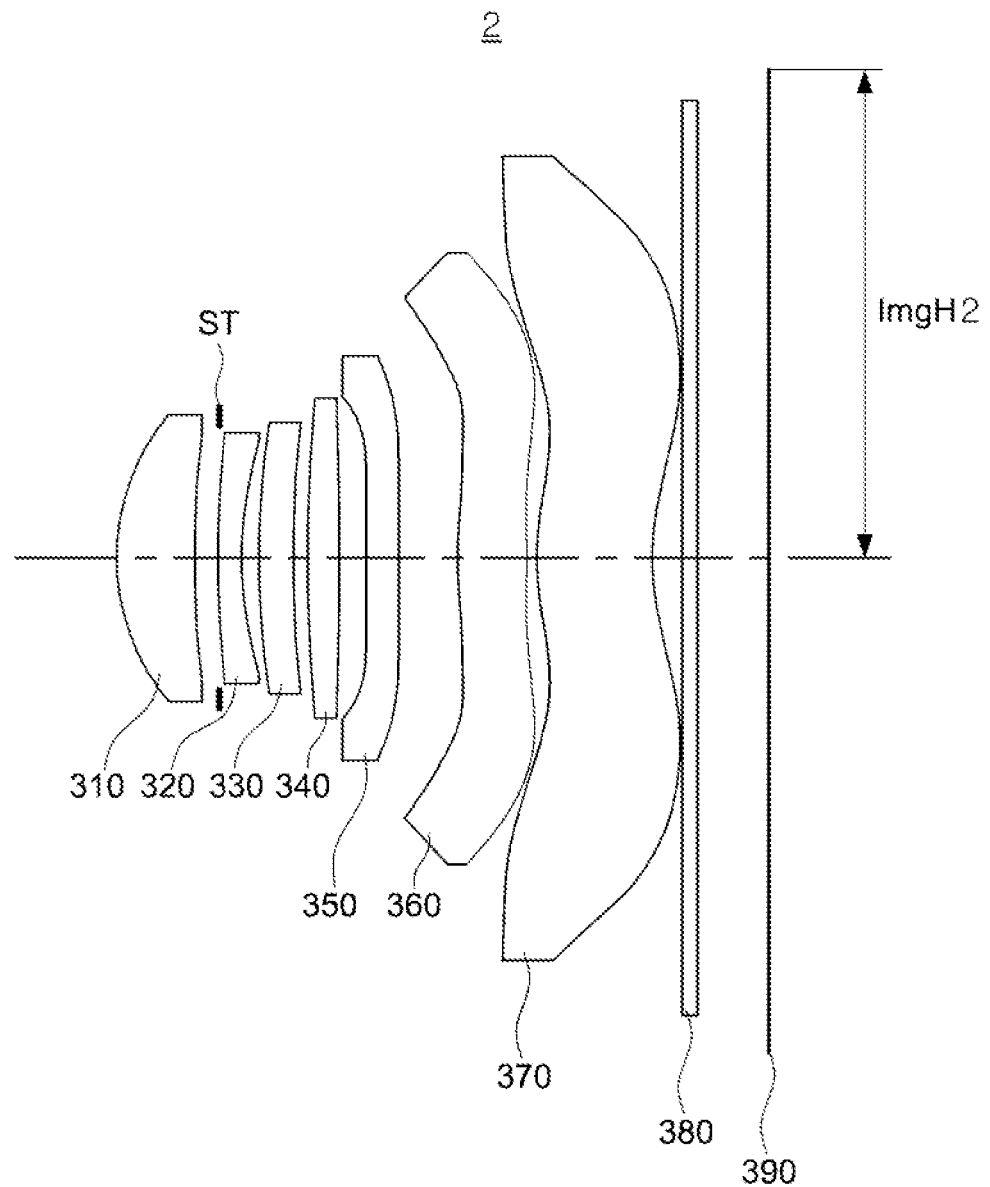
FIG. 18 is a configuration diagram of the second optical imaging system according to a third embodiment of the present disclosure.
Figure 19:
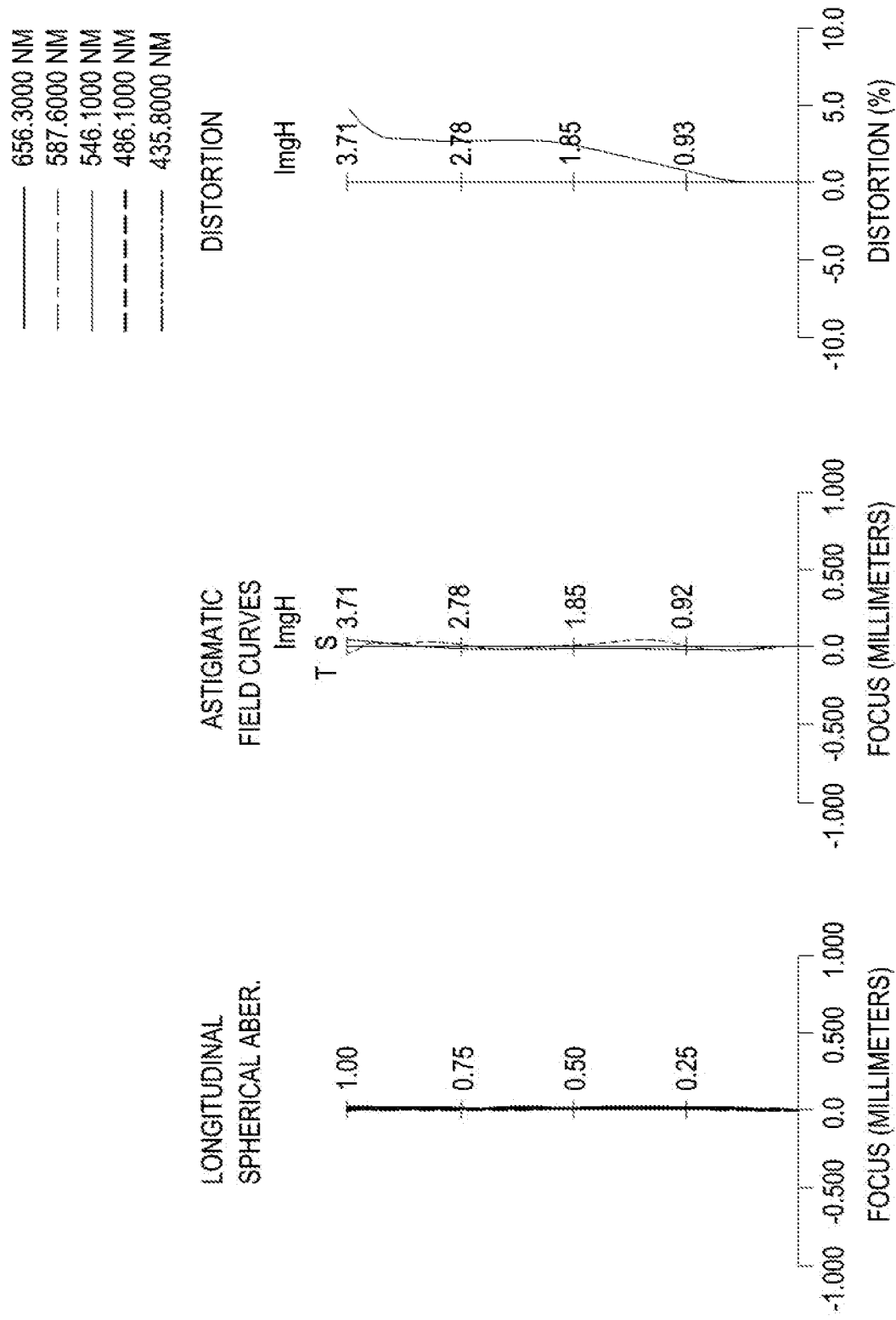
FIG. 19 is a curve representing aberration characteristics of the second optical imaging system illustrated in FIG. 18.
Figure 20:
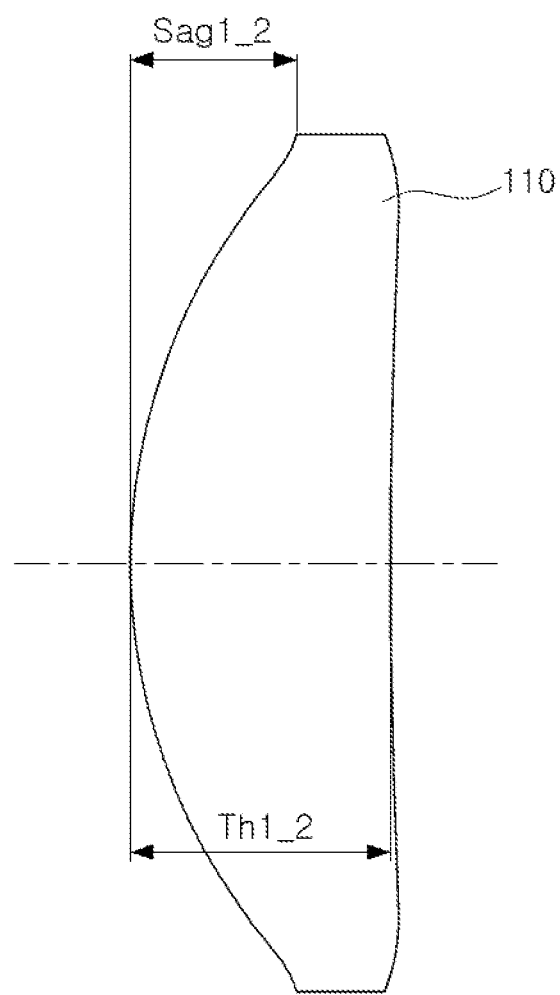
FIG. 20 is a partially enlarged view of a first lens of the second optical imaging system illustrated in FIG. 14.

Referring to FIGS. 18 and 19, according to a third embodiment of the present disclosure, a second optical imaging system 2 may include an optical system including a first lens 310, a second lens 320, a third lens 330, a fourth lens 340, a fifth lens 350, a sixth lens 360 and a seventh lens 370, sequentially disposed from an object side, and may further include an infrared block filter 380 (hereinafter referred to as a 'filter') and an image sensor 390.

The first lens 310 to the seventh lens 370 may be disposed to be spaced apart from each other by a predetermined distance along an optical axis, respectively. The first lens 310 to the seventh lens 370 may be formed of a plastic material.

Table 18 illustrates lens characteristics (a radius of curvature, a thickness of a lens, a distance between lenses, a refractive index, an Abbe number, and a focal length) of each lens.

TABLE 18

| Surface number | Reference | Radius of curvature | Thickness or distance | Refractive index | Abbe number | Focal length |
|---|---|---|---|---|---|---|
| S1 | First lens | 1.842 | 0.879 | 1.544 | 56.1 | 3.999 |
| S2 |  | 9.986 | 0.127 |  |  |  |
| S3 | Second lens | 13.514 | 0.200 | 1.661 | 20.4 | −6.959 |
| S4 |  | 3.412 | 0.182 |  |  |  |
| S5 | Third lens | 3.710 | 0.291 | 1.544 | 56.1 | −223.645 |

TABLE 18-continued

| Surface number | Reference | Radius of curvature | Thickness or distance | Refractive index | Abbe number | Focal length |
|---|---|---|---|---|---|---|
| S6 | | 3.501 | 0.089 | | | |
| S7 | Fourth lens | 2.601 | 0.317 | 1.544 | 56.1 | 7.552 |
| S8 | | 6.781 | 0.460 | | | |
| S9 | Fifth lens | −1000.000 | 0.269 | 1.650 | 21.5 | 14493820.8 |
| S10 | | −1000.000 | 0.176 | | | |
| S11 | Sixth lens | 1000.000 | 0.597 | 1.614 | 26.0 | 814.425 |
| S12 | | −1000.000 | 0.076 | | | |
| S13 | Seventh lens | 1.909 | 0.505 | 1.537 | 55.7 | −9.34 |
| S14 | | 1.255 | 0.236 | | | |
| S15 | Filter | Infinity | 0.110 | 1.518 | 64.2 | |
| S16 | | Infinity | 0.641 | | | |
| S17 | Imaging surface | Infinity | 0.010 | | | |

Meanwhile, in the second optical imaging system 2, the total focal length F2 may be 4.29 mm, the angle of view FOV2 may be 76.46°, Fno2 may be 1.55, TTL2 may be 5.166 mm, and BFL2 may be 0.997 mm.

In a third embodiment of the second optical imaging system 2, the first lens 310 may have positive refractive power, a first surface of the first lens 310 may be convex in a paraxial region, and a second surface of the first lens 310 may be concave in the paraxial region.

The second lens 320 may have negative refractive power, a first surface of the second lens 320 may be convex in a paraxial region, and a second surface of the second lens 320 may be concave in the paraxial region.

The first lens 310 and the second lens 320 may be formed of plastic materials having different optical characteristics from each other. As an example, the Abbe number of the first lens 310 and the second lens 320 may be different from each other.

The third lens 330 may have negative refractive power, a first surface of the third lens 330 may be convex in a paraxial region, and a second surface of the third lens 330 may be concave in the paraxial region.

The second lens 320 and the third lens 330 may be formed of plastic materials having different optical characteristics from each other. As an example, the Abbe number of the second lens 320 and the third lens 330 may be different from each other.

The fourth lens 340 may have positive refractive power, a first surface of the fourth lens 340 may be convex in a paraxial region, and a second surface of the fourth lens 340 may be concave in the paraxial region.

The fifth lens 350 may have positive refractive power, a first surface of the fifth lens 350 may be concave in a paraxial region, and a second surface of the fifth lens 350 may be convex in the paraxial region.

The sixth lens 360 may have positive refractive power, first and second surfaces of the sixth lens 360 may be convex in the paraxial region.

In addition, at least one inflection point may be formed on the first and second surfaces of the sixth lens 360. For example, the first surface of the sixth lens 360 may be convex in the paraxial region and may be concave toward an edge. The second surface of the sixth lens 360 may be convex in the paraxial region and may be concave toward the edge.

The seventh lens 370 may have negative refractive power, a first surface of the seventh lens 370 may be convex in the paraxial region, and a second surface of the seventh lens 370 may be concave in the paraxial region.

In addition, at least one inflection point may be formed on the first and second surfaces of the seventh lens 370. For example, the first surface of the seventh lens 370 may be convex in the paraxial region and may be concave toward the edge. The second surface of the seventh lens 370 may be concave in the paraxial region and may be convex toward the edge.

The second optical imaging system 2 may include a plurality of lenses having a high refractive index. For example, the second lens 320, the fifth lens 350 and the sixth lens 360 may have a refractive index of 1.6 or more. For example, the refractive indexes of the second lens 320 and the fifth lens 350 may be equal to or greater than 1.65 and less than 1.75, and the refractive index of the sixth lens 360 may be greater than 1.61.

In the second optical imaging system 2, the fifth lens 350 and the sixth lens 360 may have a considerably elongated focal length. For example, an absolute value of a focal length f5_2 of the fifth lens 350 and an absolute value of a focal length f6_2 of the sixth lens 360 may be 200 or more.

Meanwhile, object side surfaces and image side surfaces of the first lens 310 to the seventh lens 370 may all be aspherical surfaces. For example, each surface of the first lens 310 to the seventh lens 370 may have an aspherical surface coefficient as shown in Table 19.

TABLE 19

| | K | A | B | C | D | E | F | G | H | J |
|---|---|---|---|---|---|---|---|---|---|---|
| S1 | −1.462 | 0.013 | 0.061 | −0.172 | 0.294 | −0.317 | 0.216 | −0.090 | 0.021 | −0.002 |
| S2 | −17.911 | −0.014 | −0.068 | 0.144 | −0.186 | 0.173 | −0.121 | 0.058 | −0.016 | 0.002 |
| S3 | −86.751 | −0.039 | −0.086 | 0.224 | −0.222 | 0.132 | −0.068 | 0.039 | −0.015 | 0.002 |
| S4 | 4.714 | −0.039 | −0.046 | −0.031 | 0.481 | −1.188 | 1.542 | −1.167 | 0.490 | −0.088 |
| S5 | −12.795 | −0.003 | 0.041 | −0.082 | −0.210 | 0.766 | −1.086 | 0.789 | −0.273 | 0.034 |
| S6 | −29.088 | −0.120 | 0.394 | −1.126 | 2.317 | −3.527 | 3.656 | −2.421 | 0.933 | −0.159 |
| S7 | −1.084 | −0.220 | 0.409 | −1.013 | 1.921 | −2.623 | 2.393 | −1.384 | 0.469 | −0.072 |
| S8 | −31.367 | −0.022 | −0.035 | 0.002 | 0.091 | −0.209 | 0.203 | −0.091 | 0.012 | 0.002 |
| S9 | 0.000 | 0.126 | −0.931 | 2.533 | −4.488 | 5.319 | −4.223 | 2.151 | −0.636 | 0.083 |

TABLE 19-continued

|     | K      | A      | B      | C      | D      | E     | F      | G     | H      | J     |
|-----|--------|--------|--------|--------|--------|-------|--------|-------|--------|-------|
| S10 | 0.000  | 0.366  | −1.533 | 2.855  | −3.430 | 2.735 | −1.430 | 0.467 | −0.086 | 0.007 |
| S11 | 0.000  | 0.527  | −1.377 | 1.940  | −1.926 | 1.304 | −0.578 | 0.159 | −0.024 | 0.002 |
| S12 | 0.000  | 0.243  | −0.388 | 0.308  | −0.167 | 0.065 | −0.018 | 0.003 | 0.000  | 0.000 |
| S13 | −8.977 | −0.217 | 0.056  | 0.022  | −0.019 | 0.006 | −0.001 | 0.000 | 0.000  | 0.000 |
| S14 | −6.875 | −0.133 | 0.049  | −0.010 | 0.001  | 0.000 | 0.000  | 0.000 | 0.000  | 0.000 |

In addition, the optical imaging system thus configured may have aberration characteristics illustrated in FIG. 19.

Table 20 shows conditional expression values of the second optical imaging system 2 according to each embodiment.

TABLE 20

|                         | First embodiment of second optical imaging system | Second embodiment of second optical imaging system | Third embodiment of second optical imaging system |
|-------------------------|-------|-------|--------|
| Fno                     | 1.57  | 1.57  | 1.55   |
| TTL/ImgH2               | 1.48  | 1.48  | 1.48   |
| F2                      | 4.30  | 4.31  | 4.29   |
| FOV2                    | 76.72 | 76.50 | 76.46  |
| (R12_2 + R13_2)/(R12_2 − R13_2) | 0.00 | 0.00 | 0.00 |
| (R8_2 − R9_2)/(R8_2 + R9_2)     | 0.00 | 0.00 | 0.00 |
| v1_2-v2_2               | 35.74 | 35.74 | 35.74  |
| v3_2-v4_2               | 0.00  | 0.00  | −30.14 |
| Th1_2/Sag1_2            | 1.54  | 1.53  | 1.61   |
| v7_2                    | 55.66 | 55.66 | 55.66  |
| Nd2_2                   | 1.66  | 1.66  | 1.66   |
| Nd5_2                   | 1.66  | 1.65  | 1.65   |
| Nd6_2                   | 1.64  | 1.61  | 1.61   |

Hereinafter, a third optical imaging system 3 will be described with reference to FIGS. 21 to 29.

The third optical imaging system 3 may satisfy at least one of the following conditional expressions.

$0.7 < TTL3/F3 < 1.0$      [Conditional Expression 33]

$0.15 < R1\_3/F3 < 0.32$      [Conditional Expression 34]

$-3.5 < F3/f2\_3 < -0.5$      [Conditional Expression 35]

$0.1 < d45\_3/TTL3 < 0.7$      [Conditional Expression 36]

$1.6 < Nd6\_3 < 1.75$      [Conditional Expression 37]

$0.3 < \tan \theta\_3 < 0.5$      [Conditional Expression 38]

$2.0 < Fno3 < 2.7$      [Conditional Expression 39]

TTL3 may be a distance from an object side surface of the first lens of the third optical imaging system 3 to an imaging surface of the image sensor, F3 may be the total focal length of the third optical imaging system 3, f2_3 may be a focal length of the second lens of the third optical imaging system 3, R1_3 may be the radius of curvature of the object side surface of the first lens of the third optical imaging system 3, d45_3 may be a distance from the image side surface of the fourth lens of the third optical imaging system 3 to the object side surface of the fifth lens, Nd6_3 may be a refractive index of the sixth lens of the third optical imaging system 3, θ_3 may be the half angle of view of the third optical imaging system 3, and Fno3 may be a number (f-number) representing brightness of the third optical imaging system 3.

The conditional expression 33 may be a condition for miniaturizing the third optical imaging system 3. For example, when an upper limit value of the conditional expression 33 is exceeded, it is difficult to be miniaturized, and thus is difficult to be mounted on portable electronic devices, and when a lower limit value of the conditional expression 33 is exceeded, it is difficult to be manufactured.

The conditional expression 34 may be a condition for manufacturing a first lens for constructing the angle of view of the third optical imaging system 3 to be relatively narrow. For example, the first lens, which exceeds the upper limit value of the conditional expression 34, may increase longitudinal spherical aberration and shorten the focal length of the third optical imaging system 3, and the first lens, which exceeds the lower limit value of the conditional expression 34, may increase the focal length of the third optical imaging system 3, but the lens may be difficult to be manufactured. Further, the first lens, which exceeds the lower limit value of the conditional expression 34, may have a thinner thickness in a lens edge portion, making it difficult to be manufactured.

The conditional expression 35 may be a design condition of the second lens for realizing high resolution. For example, the second lens, which exceeds a numerical value of the conditional expression 35, may increase astigmatism of the third optical imaging system 3 to cause image deterioration.

Conditional expression 36 may be a design condition for constructing the angle of view of the third optical imaging system 3 to be relatively narrow. For example, when the lower limit value of the conditional expression 35 is exceeded, the focal length may be short and it is difficult to use for telephoto. When the upper limit value of the conditional expression 36 is exceeded, the total focal length TTL of the third optical imaging system 3 may become large and it is difficult to be miniaturized.

Conditional expression 37 may be a design condition of the sixth lens for realizing high resolution. For example, the sixth lens satisfying the numerical range of the conditional expression 37 may have a low Abbe number of 26 or less, such that it is advantageous in correcting astigmatism, longitudinal chromatic aberration, and magnification aberration.

Conditional expression 38 may be the angle of view of the third optical imaging system 3, and conditional expression 39 may be a numerical range of Fno3 for realizing high resolution.

In the third optical imaging system 3, the refractive power of the lens (the reciprocal of the absolute value of the focal length) may be disposed in a predetermined order. As an example, the refractive power of the odd-numbered lens may be greater than the refractive power of the even-numbered lens disposed on the image side. For example, the refractive power of the first lens may be greater than the refractive power of the second lens, the refractive power of the third lens may be greater than the refractive power of the fourth lens, and the refractive power of the fifth lens may be greater than the refractive power of the sixth lens.

In the third optical imaging system, a lens having the largest refractive power may be disposed close to an object side, a lens having the smallest refractive power may be disposed close to an image side. For example, the first lens of the third optical imaging system 3 may have the largest refractive power, and the fourth lens or the sixth lens may have the smallest refractive power.

In the third optical imaging system 3, the first lens may have the most convex surface. For example, the object side surface of the first lens may be the most convex surface among the surfaces of each lens. In the third optical imaging system 3, the second lens may have the most concave surface. For example, the image side surface of the second lens may be the most concave surface. In the third optical imaging system 3, the fourth lens may have a generally flat surface. For example, the image side surface of the fourth lens may be a shape close to a plane.

In the third optical imaging system 3, three or more lenses adjacent to each other may have substantially similar refractive indexes. For example, the second lens to the fourth lens may have substantially the same or similar refractive index. The refractive index of the second lens to the fourth lens may be selected in the range of 1.63 to 1.68.

Figure 21:
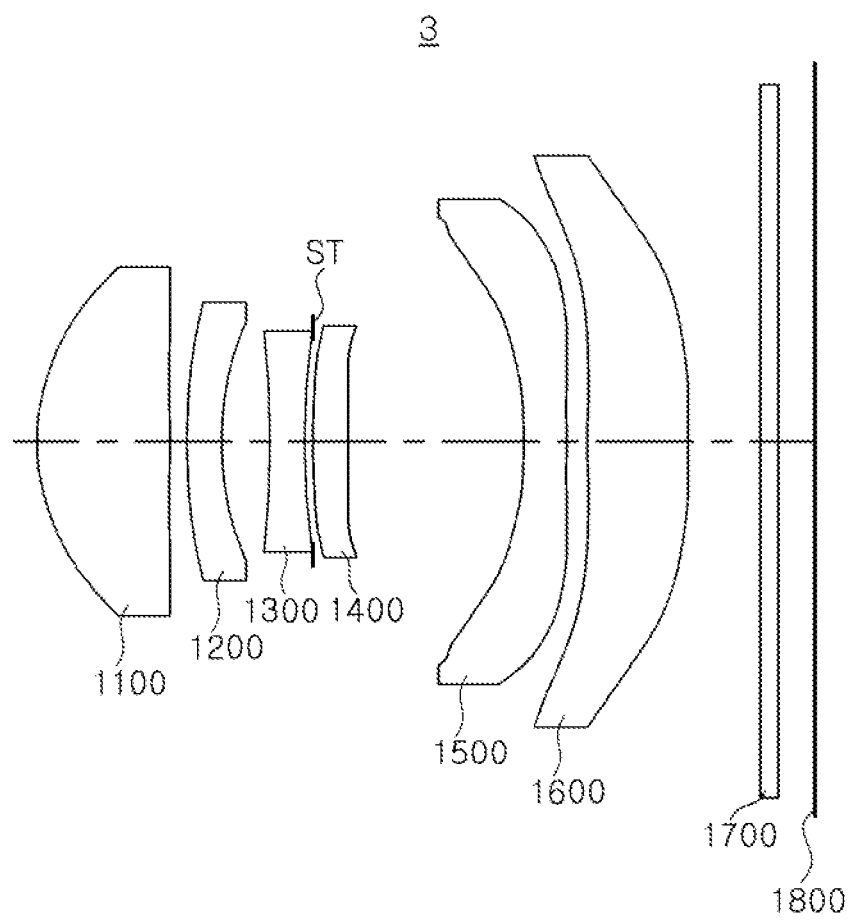
FIG. 21 is a configuration diagram of a third optical imaging system according to a first embodiment of the present disclosure.
Figure 23:
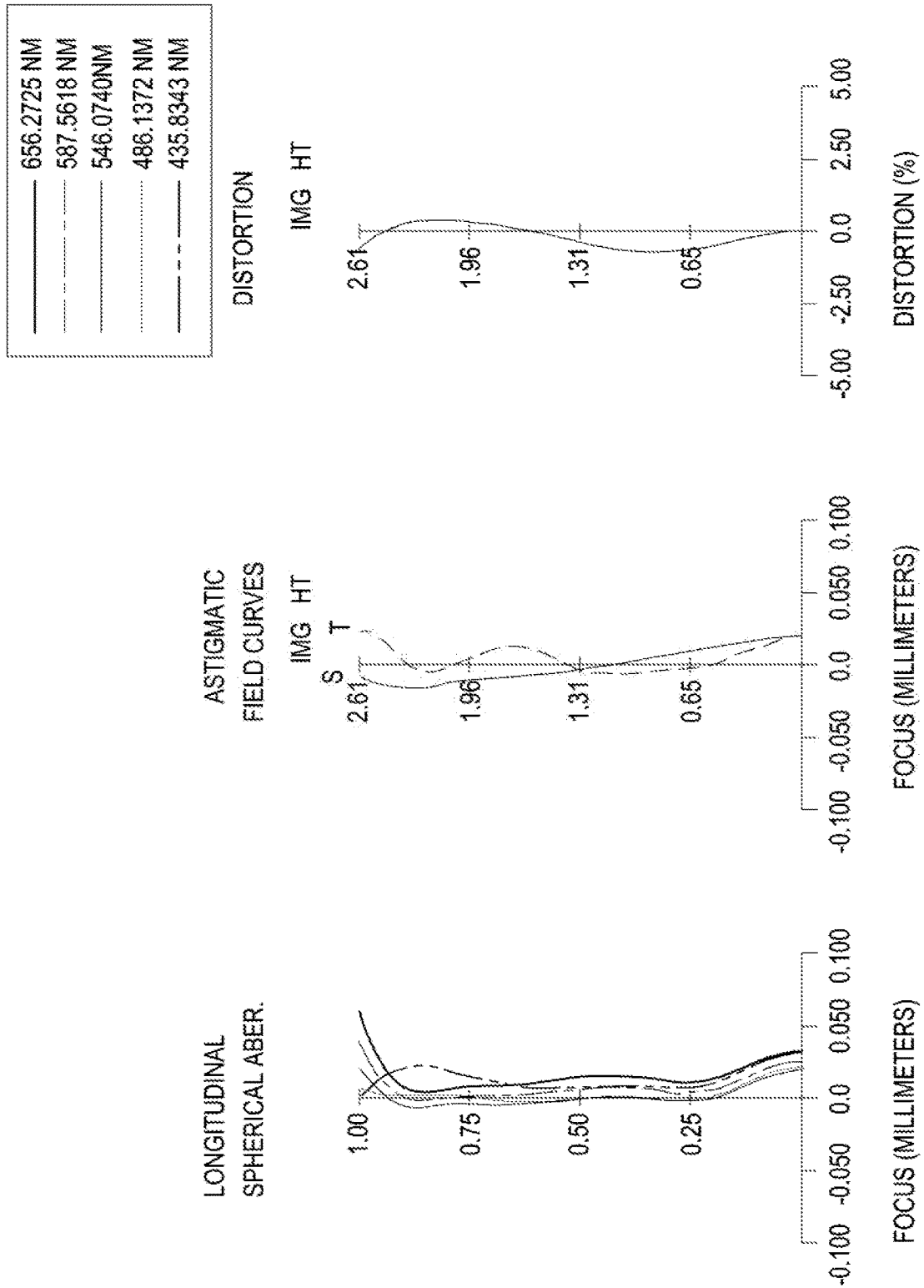
FIG. 23 is a curve representing aberration characteristics of the third optical imaging system illustrated in FIG. 21.

Referring to FIGS. 21 to 23, according to a first embodiment of the present disclosure, a third optical imaging system 3 may include an optical system including a first lens 1100, a second lens 1200, a third lens 1300, a fourth lens 1400, a fifth lens 1500, and a sixth lens 1600, sequentially disposed from an object side, and may further include an infrared block filter 1700 (hereinafter, referred to as a 'filter') and an image sensor 1800.

The first lens 1100 to the sixth lens 1600 may be disposed to be spaced apart from each other by a predetermined distance along an optical axis. The first lens 1100 to the sixth lens 1600 may be formed of a plastic material.

Table 21 illustrates lens characteristics (a radius of curvature, a thickness of a lens or a distance between lenses, a refractive index, an Abbe number, and a focal length) of each lens.

BFL3 may be a distance from an image side surface of the sixth lens 160 to an imaging surface of the image sensor 180.

In a first embodiment of the third optical imaging system 3, the first lens 1100 may have positive refractive power, first and second surfaces of the first lens 1100 may be convex in a paraxial region.

The second lens 1200 may have negative refractive power, a first surface of the second lens 1200 may be convex in a paraxial region, and a second surface of the second lens 1200 may be concave in the paraxial region.

The first lens 1100 and the second lens 1200 may be formed of plastic materials having different optical characteristics from each other. As an example, the Abbe number of the first lens 1100 and the second lens 1200 may be different from each other.

The third lens 1300 may have negative refractive power, first and second surfaces of the third lens 1300 may be concave in the paraxial region.

The second lens 1200 and the third lens 1300 may be formed of plastic materials having different optical characteristics from each other. As an example, the Abbe numbers of the second lens 1200 and the third lens 1300 may be different from each other.

The fourth lens 1400 may have positive refractive power, first and second surfaces of the fourth lens 1400 may be convex in the paraxial region.

A stop ST may be disposed between the third lens 1300 and the fourth lens 1400.

The fifth lens 1500 may have negative refractive power, first and second surfaces of the fifth lens 1500 may be concave in the paraxial region.

In addition, at least one inflection point may be formed on the first and second surfaces of the fifth lens 1500. For example, the first surface of the fifth lens 1500 may be concave in the paraxial region and may be convex toward an edge. The second surface of the fifth lens 1500 may be concave in the paraxial region and may be convex toward the edge.

The sixth lens 1600 may have positive refractive power, first and second surfaces of the sixth lens 1600 may be convex in the paraxial region.

TABLE 21

| Surface number | Reference | Radius of curvature | Thickness or distance | Refractive index | Abbe number | Focal length |
|---|---|---|---|---|---|---|
| S1 | First lens | 1.5100 | 0.9130 | 1.544 | 56.1 | 2.750 |
| S2 | | −323.8700 | 0.1300 | | | |
| S3 | Second lens | 6.2200 | 0.2400 | 1.661 | 20.3 | −6.460 |
| S4 | | 2.5100 | 0.3320 | | | |
| S5 | Third lens | −7.1600 | 0.2400 | 1.650 | 21.5 | −4.260 |
| S6 | | 4.6600 | 0.0500 | | | |
| S7 | Stop | Infinity | 0.0100 | | | |
| S8 | Fourth lens | 4.6400 | 0.2400 | 1.650 | 21.5 | 6.900 |
| S9 | | −200.0000 | 1.2210 | | | |
| S10 | Fifth lens | −2.730 | 0.2900 | 1.544 | 56.1 | −4.230 |
| S11 | | 15.730 | 0.1500 | | | |
| S12 | Sixth lens | 17.180 | 0.6980 | 1.650 | 21.5 | 10.310 |
| S13 | | −11.010 | 0.5000 | | | |
| S14 | Filter | Infinity | 0.1100 | 1.523 | 39.1 | |
| S15 | | Infinity | 0.2670 | | | |
| S16 | Imaging surface | Infinity | | | | |

Meanwhile, in the third optical imaging system 3, the total focal length F3 may be 5.997 mm, the angle of view FOV3 may be 47.594°, Fno3 may be 2.48, TTL3 may be 5.391 mm, and BFL3 may be 0.877 mm.

In addition, at least one inflection point may be formed on the first and second surfaces of the sixth lens 1600. For example, the first surface of the sixth lens 1600 may be convex in the paraxial region and may be concave toward an edge. The second surface of the sixth lens 1600 may be convex in the paraxial region and may be concave toward the edge.

Among the first lens 1100 to the sixth lens 1600, the absolute value of the focal length of the first lens 1100 may be the smallest, and the absolute value of the focal length of the sixth lens 1600 may be the largest.

Meanwhile, object side surfaces and image side surfaces of the first lens 1100 to the sixth lens 1600 may all be aspherical surfaces. For example, each surface of the first lens 1100 to the sixth lens 1600 may have an aspherical surface coefficient as shown in FIG. 22.

In addition, the optical imaging system thus configured may have aberration characteristics illustrated in FIG. 23.

Figure 24:
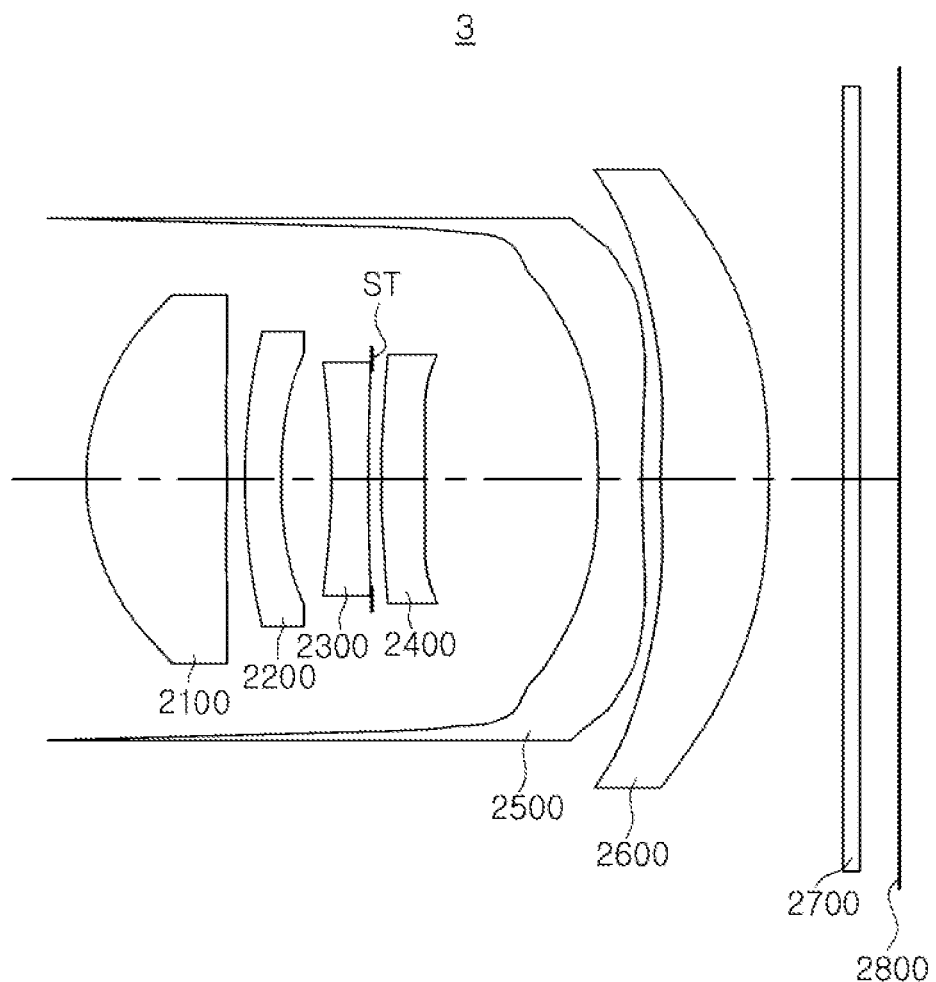
FIG. 24 is a configuration diagram of the third optical imaging system according to a second embodiment of the present disclosure.
Figure 26:
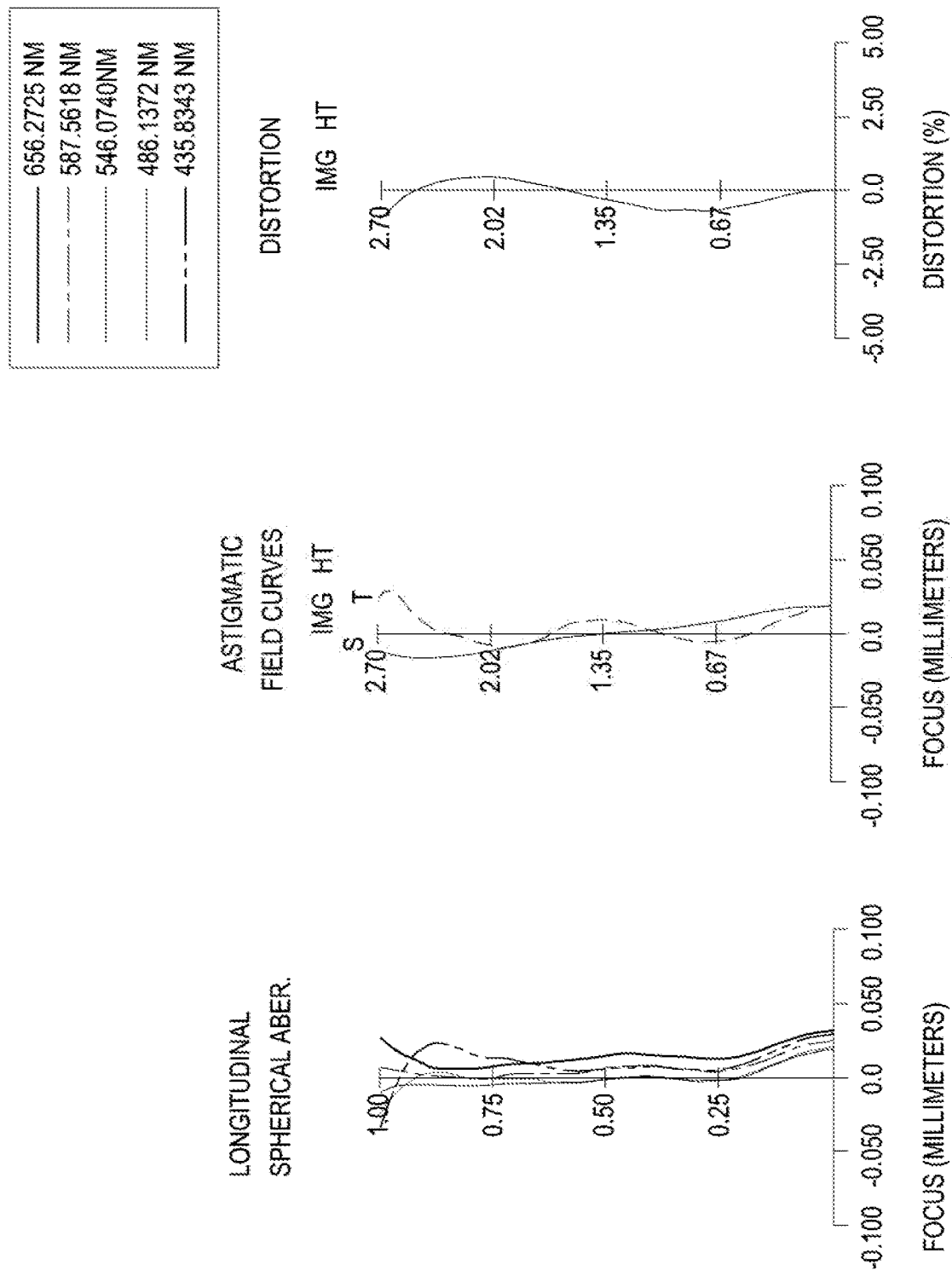
FIG. 26 is a curve representing aberration characteristics of the third optical imaging system illustrated in FIG. 24.

Referring to FIGS. 24 to 26, according to a second embodiment of the present disclosure, a third optical imaging system 3 may include an optical system including a first lens 2100, a second lens 2200, a third lens 2300, a fourth lens 2400, a fifth lens 2500, and a sixth lens 2600, sequentially disposed from an object side, and may further include an infrared block filter 2700 (hereinafter, referred to as a 'filter') and an image sensor 2800.

The first lens 2100 to the sixth lens 2600 may be disposed to be spaced apart from each other by a predetermined distance along an optical axis, respectively. The first lens 2100 to the sixth lens 2600 may be formed of a plastic material.

Table 22 illustrates lens characteristics (a radius of curvature, a thickness of a lens or a distance between lenses, a refractive index, an Abbe number, and a focal length) of each lens.

teristics from each other. As an example, the Abbe number of the first lens 2100 and the second lens 2200 may be different from each other.

The third lens 2400 may have negative refractive power, and first and second surfaces of the third lens 2300 may be concave in the paraxial region.

The second lens 2200 and the third lens 2300 may be formed of plastic materials having different optical characteristics from each other. As an example, the Abbe number of the second lens 2200 and the third lens 2300 may be different from each other.

The fourth lens 2400 may have positive refractive power, and first and second surfaces of the fourth lens 2400 may be convex in the paraxial region.

A stop ST may be disposed between the third lens 2300 and the fourth lens 2400.

The fifth lens 2500 may have negative refractive power, first and second surfaces of the fifth lens 2500 may be concave in the paraxial region.

In addition, at least one inflection point may be formed on the first and second surfaces of the fifth lens 2500. For example, the first surface of the fifth lens 2500 may be concave in the paraxial region and may be convex toward an edge. The second surface of the fifth lens 2500 may be concave in the paraxial region and may be convex toward the edge.

The sixth lens 2600 may have positive refractive power, and first and second surfaces of the sixth surface 2600 may be convex in a paraxial region.

At least one inflection point may be formed on the first and second surfaces of the sixth lens 2600. For example, the

TABLE 22

| Surface number | Reference | Radius of curvature | Thickness or distance | Refractive index | Abbe number | Focal length |
|---|---|---|---|---|---|---|
| S1 | First lens | 1.5100 | 0.9090 | 1.544 | 56.1 | 2.760 |
| S2 |  | −4974.2600 | 0.1210 |  |  |  |
| S3 | Second lens | 6.6100 | 0.2400 | 1.661 | 20.3 | −6.960 |
| S4 |  | 2.6900 | 0.3430 |  |  |  |
| S5 | Third lens | −5.1000 | 0.2400 | 1.650 | 21.5 | −5.300 |
| S6 |  | 11.2400 | 0.0180 |  |  |  |
| S7 | Stop | Infinity | 0.0700 |  |  |  |
| S8 | Fourth lens | 6.9800 | 0.2400 | 1.650 | 21.5 | 10.590 |
| S9 |  | −2000.0000 | 1.2040 |  |  |  |
| S10 | Fifth lens | −2.990 | 0.2900 | 1.544 | 56.1 | −4.230 |
| S11 |  | 10.600 | 0.1290 |  |  |  |
| S12 | Sixth lens | 17.560 | 0.7090 | 1.650 | 21.5 | 11.500 |
| S13 |  | −13.0700 | 0.5000 |  |  |  |
| S14 | Filter | Infinity | 0.1100 | 1.523 | 39.1 |  |
| S15 |  | Infinity | 0.2660 |  |  |  |
| S16 | Imaging surface | Infinity |  |  |  |  |

Meanwhile, in the third optical imaging system 3, the total focal length F3 may be 6.001 mm, the angle of view (FOV3) may be 47.594°, Fno3 may be 2.488, TTL3 may be 5.389 mm, and BFL3 may be 0.876 mm.

In a second embodiment of the third optical imaging system 3, the first lens 2100 may have positive refractive power, first and second surfaces of the first lens 2100 may be convex in a paraxial region.

The second lens 2200 may have negative refractive power, a first surface of the second lens 2200 may be convex in a paraxial region, and a second surface of the second lens 2200 may be concave in the paraxial region.

The first lens 2100 and the second lens 2200 may be formed of plastic materials having different optical characfirst surface of the sixth lens 2600 may be convex in the paraxial region and may be concave toward an edge. The second surface of the sixth lens 2600 may be convex in the paraxial region and may be concave toward the edge.

Among the first lens 2100 to the sixth lens 2600, the absolute value of the focal length of the first lens 2100 may be the smallest, and the absolute value of the focal length of the sixth lens 2600 may be the largest.

Meanwhile, object side surfaces and image side surfaces of the first lens 2100 to the sixth lens 2600 may all be aspherical surfaces. For example, each surface of the first lens 2100 to the sixth lens 2600 may have an aspherical surface coefficient as shown in FIG. 25.

In addition, the optical imaging system thus configured may have aberration characteristics illustrated in FIG. 26.

Figure 27:
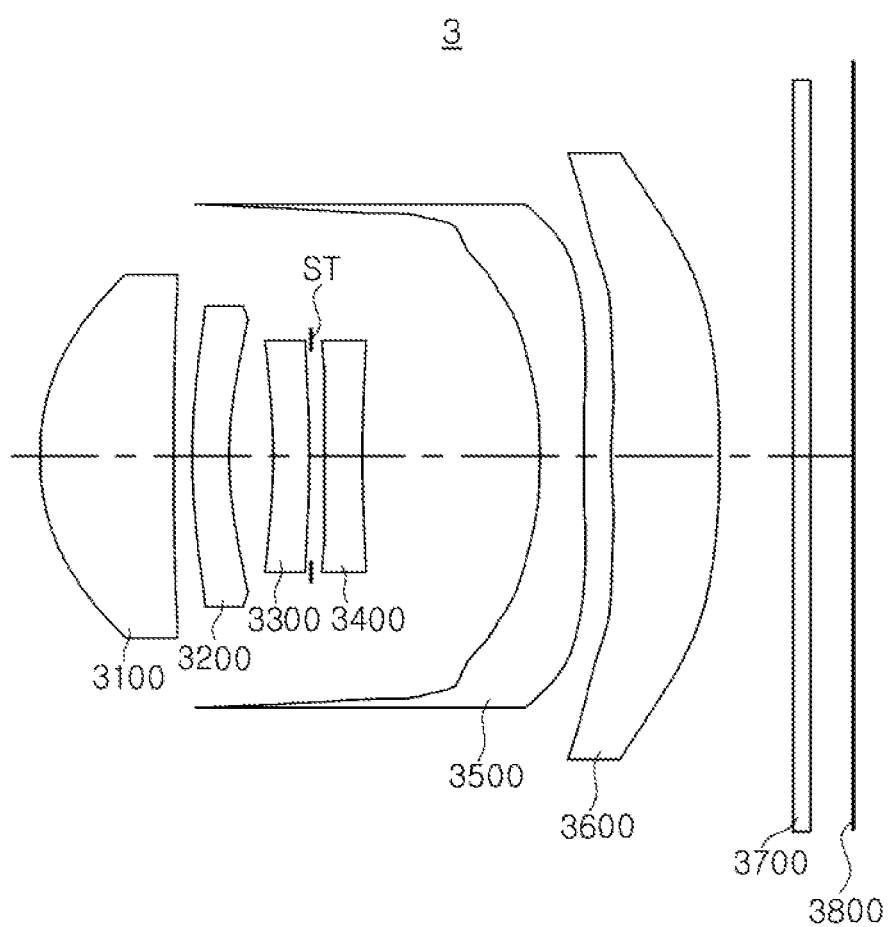
FIG. 27 is a configuration diagram of the third optical imaging system according to a third embodiment of the present disclosure.
Figure 29:
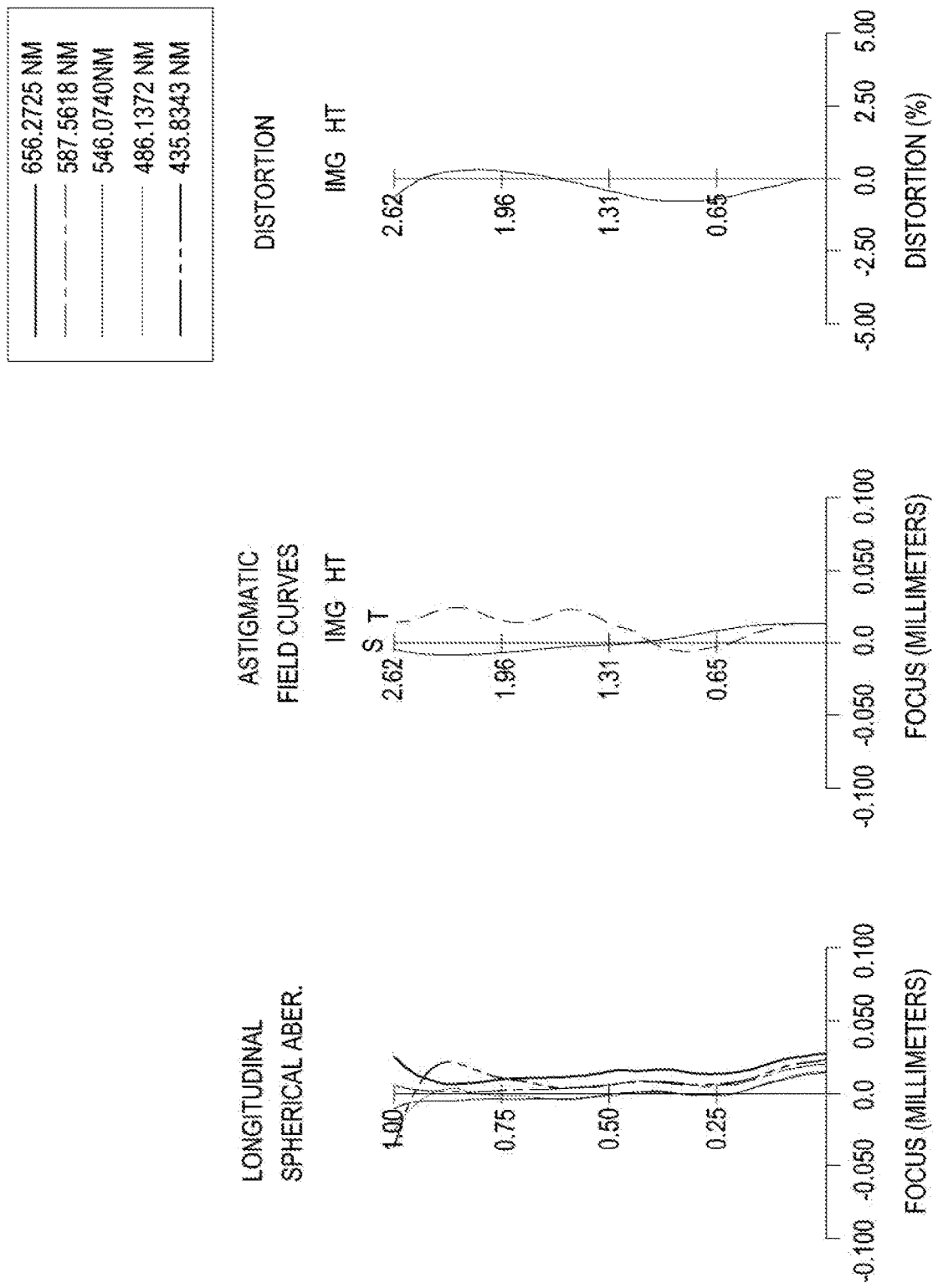
FIG. 29 is a curve representing aberration characteristics of the third optical imaging system illustrated in FIG. 27.

Referring to FIGS. 27 to 29, according to a third embodiment of the present disclosure, a third optical imaging system 3 may include an optical system including a first lens 3100, a second lens 3200, a third lens 3300, a fourth lens 3400, a fifth lens 3500, and a sixth lens 3600, sequentially disposed from an object side, and may further include an infrared block filter 3700 (hereinafter, referred to as a 'filter') and an image sensor 3800.

The first lens 3100 to the sixth lens 3600 may be disposed to be spaced apart from each other by a predetermined distance along an optical axis, respectively. The first lens 3100 to the sixth lens 3600 may be formed of a plastic material.

Table 23 illustrates lens characteristics (a radius of curvature, a thickness of a lens or a distance between lenses, a refractive index, an Abbe number, and a focal length) of each lens.

TABLE 23

| Surface number | Reference | Radius of curvature | Thickness or distance | Refractive index | Abbe number | Focal length |
|---|---|---|---|---|---|---|
| S1 | First lens | 1.4900 | 0.891 | 1.544 | 56.1 | 2.770 |
| S2 | | 65.7500 | 0.121 | | | |
| S3 | Second lens | 13.0600 | 0.240 | 1.661 | 20.3 | −7.690 |
| S4 | | 3.6600 | 0.301 | | | |
| S5 | Third lens | −4.9600 | 0.240 | 1.650 | 21.5 | −10.43 |
| S6 | | −18.2300 | 0.007 | | | |
| S7 | Stop | Infinity | 0.100 | | | |
| S8 | Fourth lens | 20000.0 | 0.240 | 1.650 | 21.5 | −18899.98 |
| S9 | | 7663.75 | 1.182 | | | |
| S10 | Fifth lens | −3.1200 | 0.290 | 1.544 | 56.1 | −4.25 |
| S11 | | 9.3600 | 0.189 | | | |
| S12 | Sixth lens | 18.6100 | 0.713 | 1.650 | 21.5 | 12.03 |
| S13 | | −13.5400 | 0.500 | | | |
| S14 | Filter | Infinity | 0.110 | 1.523 | 39.1 | |
| S15 | | Infinity | 0.271 | | | |
| S16 | Imaging surface | Infinity | | | | |

Meanwhile, in the third optical imaging system 3, the total focal length F3 may be 6.001 mm, the angle of view (FOV3) may be 47.594°, Fno3 may be 2.59, TTL3 may be 5.395 mm, and BFL3 may be 0.881 mm.

In the third embodiment of the third optical imaging system 3, the first lens 3100 may have positive refractive power, a first surface of the first lens 3100 may be convex in a paraxial region, and a second surface of the first lens 3100 may be concave in the paraxial region.

The second lens 3200 may have negative refractive power, a first surface of the second lens 3200 may be convex in a paraxial region, and a second surface of the second lens 3200 may be concave in the paraxial region.

The first lens 3100 and the second lens 3200 may be formed of plastic materials having different optical characteristics from each other. As an example, the Abbe number of the first lens 3100 and the second lens 3200 may be different from each other.

The third lens 3300 may have negative refractive power, a first surface of the third lens 3300 may be concave in a paraxial region, and a second surface of the third lens 3300 may be convex in the paraxial region.

The second lens 3200 and the third lens 3300 may be formed of plastic materials having different optical characteristics from each other. As an example, the Abbe number of the second lens 3200 and the third lens 3300 may be different from each other.

The fourth lens 3400 may have negative refractive power, and a first surface of the fourth lens 3400 may be convex in a paraxial region, and a second surface of the fourth lens 3400 may be concave in the paraxial region.

A stop ST may be disposed between the third lens 3300 and the fourth lens 3400.

The fifth lens 3500 may have negative refractive power, and first and second surfaces of the fifth lens 3500 may be concave in the paraxial region.

In addition, at least one inflection point may be formed on the first and second surfaces of the fifth lens 3500. For example, the first surface of the fifth lens 3500 may be concave in the paraxial region and may be convex toward an edge. The second surface of the fifth lens 3500 may be concave in the paraxial region and may be convex toward the edge.

The sixth lens 3600 may have positive refractive power, first and second surfaces of the sixth lens 3600 may be convex in a paraxial region.

In addition, at least one inflection point may be formed on the first and second surfaces of the sixth lens 3600. For example, the first surface of the sixth lens 3600 may be convex in the paraxial region and may be concave toward an edge. The second surface of the sixth lens 3600 may be convex in the paraxial region and may be concave toward the edge.

Among the first lens 3100 to the sixth lens 3600, the absolute value of the focal length of the first lens 3100 may be the smallest, and the absolute value of the focal length of the fourth lens 3400 may be the largest.

Meanwhile, object side surfaces and image side surfaces of the first lens 3100 to the sixth lens 3600 may all be aspherical surfaces. For example, each surface of the first lens 3100 to the sixth lens 3600 may have an aspherical surface coefficient as shown in FIG. 28.

In addition, the optical imaging system thus configured may have aberration characteristics illustrated in FIG. 29.

Table 24 shows conditional expression values of the third optical imaging system 3 according to each embodiment.

TABLE 24

| | First embodiment of third optical imaging system | Second embodiment of third optical imaging system | Third embodiment of third optical imaging system |
|---|---|---|---|
| TTL3/F3 | 0.899 | 0.898 | 0.899 |
| R1_3/F3 | 0.251 | 0.252 | 0.248 |

TABLE 24-continued

| | First embodiment of third optical imaging system | Second embodiment of third optical imaging system | Third embodiment of third optical imaging system |
|---|---|---|---|
| F3/f2_3 | −0.928 | −0.862 | −0.781 |
| d45_3/TTL3 | 0.226 | 0.223 | 0.219 |
| Nd6_3 | 1.65 | 1.65 | 2.65 |
| tanθ_3 | 0.441 | 0.441 | 0.441 |
| Fno3 | 2.48 | 2.488 | 2.59 |

As set forth above, according to an embodiment of the present disclosure, a subject may be captured at various distances.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having negative refractive power, a concave object-side surface and a concave image-side surface;
a second lens having positive refractive power, a convex object-side surface and a concave image-side surface;
a third lens having positive refractive power;
a fourth lens having negative refractive power;
a fifth lens having positive refractive power; and
a sixth lens having negative refractive power,
wherein the first to sixth lenses are sequentially disposed from an object side,
wherein TTL1/F1>2.0 is satisfied, where TTL1 is a distance from the object side surface of the first lens to an imaging surface, and F1 is a total focal length of the optical imaging system, and
wherein 0.5<R2_1/F1<2.0 is satisfied, where R2_1 is a radius of curvature of the image-side surface of the first lens.

2. The optical imaging system of claim 1, wherein 1.0<|f1_1/F1|<2.0 is satisfied, where f1_1 is a focal length of the first lens.

3. The optical imaging system of claim 1, wherein −1.0<f3_1/f1_1<0 is satisfied, where f3_1 is a focal length of the third lens.

4. The optical imaging system of claim 1, wherein v2_1<26 is satisfied, where v2_1 is an Abbe number of the second lens.

5. The optical imaging system of claim 4, wherein v1_1−v2_1>30 is satisfied, where v1_1 is an Abbe number of the first lens.

6. The optical imaging system of claim 4, wherein v2_1+v6_1<v3_1 is satisfied, where v3_1 is an Abbe number of the third lens, and v6_1 is an Abbe number of the sixth lens.

7. The optical imaging system of claim 6, wherein the Abbe number of the sixth lens is 26 or less.

8. The optical imaging system of claim 6, wherein AVR(v4_1, v6_1)<24 is satisfied, where AVR(v4_1, v6_1) is an average value of the Abbe number of the fourth lens and the Abbe number of the sixth lens.

9. The optical imaging system of claim 8, wherein AVR(v3_1, v5_1)>55 is satisfied, where AVR(v3_1, v5_1) is an average value of an Abbe number of the third lens and an Abbe number of the fifth lens.

10. The optical imaging system of claim 1, wherein an angle of view of the optical imaging system is 100° or more.

11. The optical imaging system of claim 1, wherein Fno1≤2.4 is satisfied, where Fno1 is a f-number of the optical imaging system.

12. The optical imaging system of claim 1, wherein the third lens has a convex object-side surface and a convex image-side surface.

13. The optical imaging system of claim 1, wherein the fourth lens has a convex object-side surface and a concave image-side surface.

14. The optical imaging system of claim 1, wherein the fifth lens has a convex object-side surface and a convex image-side surface.

15. The optical imaging system of claim 1, wherein the sixth lens has a convex object-side surface and a concave image-side surface.

16. The optical imaging system of claim 1, wherein at least one inflection point is formed on the object-side surface of the first lens.

17. The optical imaging system of claim 1, wherein at least one inflection point is formed on the object-side surface and the image surface of the sixth lens, respectively.

18. The optical imaging system of claim 1, wherein the first to sixth lenses are formed of a plastic material.

19. The optical imaging system of claim 1, wherein each surface of the first to sixth lenses is an aspherical surface.

20. The optical imaging system of claim 1, wherein the optical imaging system has a total of six lenses.

* * * * *